US009906888B2

(12) United States Patent
Ge et al.

(10) Patent No.: US 9,906,888 B2
(45) Date of Patent: Feb. 27, 2018

(54) HYBRID RELAY SCHEME

(71) Applicant: QUALCOMM Incorporated, San Diego, CA (US)

(72) Inventors: Feng Ge, Highland Park, NJ (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/107,195

(22) Filed: Dec. 16, 2013

(65) Prior Publication Data
US 2015/0172387 A1 Jun. 18, 2015

(51) Int. Cl.
*H04W 4/00* (2009.01)
*H04W 48/16* (2009.01)
*H04W 8/00* (2009.01)
*H04W 48/12* (2009.01)
*H04B 7/155* (2006.01)

(52) U.S. Cl.
CPC ........... *H04W 4/005* (2013.01); *H04B 7/155* (2013.01); *H04W 8/005* (2013.01); *H04W 48/12* (2013.01); *H04W 48/16* (2013.01)

(58) Field of Classification Search
CPC ..... H04W 4/005; H04W 48/16; H04W 88/04; H04L 67/12; H04B 7/15
See application file for complete search history.

(56) References Cited

U.S. PATENT DOCUMENTS

| 2013/0016630 A1* | 1/2013 | Bhushan et al. ............... 370/255 |
| 2013/0083653 A1 | 4/2013 | Jain et al. |
| 2013/0100895 A1 | 4/2013 | Aghili et al. |

(Continued)

FOREIGN PATENT DOCUMENTS

| WO | WO-2013012262 A2 | 1/2013 |
| WO | WO-2013134685 A2 | 9/2013 |
| WO | WO 2013142040 A1 | 9/2013 |

OTHER PUBLICATIONS

ISA/EPO, International Search Report and Written Opinion of the International Searching Authority, Int'l. App. No. PCT/US2014/068563, dated Apr. 28, 2015, European Patent Office, Rijswijk, NL, 11 pgs.

(Continued)

*Primary Examiner* — Pao Sinkantarakorn
(74) *Attorney, Agent, or Firm* — Holland & Hart LLP

(57) ABSTRACT

Methods, systems, and devices are described for improving uplink communications of a machine type communication (MTC) device by relaying communications through a first device, such as a mobile device or user equipment (UE), to a second device, such as a base station or Evolved-NodeB (eNB). In an embodiment, a relay device may participate in a discovery process to discover an MTC device. The relay device may then receive data from the discovered MTC device, such as through a peer-to-peer link, and relay the data to a base station through a second communication link. In another embodiment, an MTC device may participate in a discovery process with a first device, such as a relay UE. The MTC device may then transmit data to the relay UE for relaying to a second device, such as a base station. In either case, the MTC device may receive data directly from the base station.

21 Claims, 16 Drawing Sheets

(56) References Cited

U.S. PATENT DOCUMENTS

| | | |
|---|---|---|
| 2013/0182680 A1 | 7/2013 | Choi et al. |
| 2013/0188546 A1* | 7/2013 | Turtinen et al. |
| 2013/0235791 A1* | 9/2013 | Abraham et al. ............. 370/315 |
| 2014/0153469 A1* | 6/2014 | Park et al. .................... 370/311 |
| 2015/0029866 A1* | 1/2015 | Liao ..................... H04W 4/008 370/241 |

OTHER PUBLICATIONS

IPEA/EPO, Second Written Opinion of the International Preliminary Examining Authority, Int'l. App. No. PCT/US2014/068563, dated Apr. 28, 2015, European Patent Office, Rijswijk, NL, 4 pgs.
Motorola, "Link Budget on the Uplink for IEEE 802.16e," IEEE C80216e-04/237, vol. 802.16e, Jul. 7, 2004 (Jul. 7, 2004), pp. 1-8, XP017624257.

* cited by examiner

HYBRID RELAY SCHEME

BACKGROUND

The following relates generally to wireless communication, and more specifically to improving uplink communications for Machine-to-Machine (M2M) communication or Machine Type Communication (MTC) devices. M2M or MTC refers to data communication technologies that allow automated devices to communicate with one another without human intervention. For example, M2M and/or MTC may refer to communications from devices that integrate sensors or meters to measure or capture information and relay that information to a central server or application program that can make use of the information or present the information to humans interacting with the program or application. These devices may be called M2M devices, MTC devices and/or MTC user equipments (UEs).

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The market for MTC devices is expected to grow rapidly as industries such as automotive, security, healthcare, and fleet management employ MTC to increase productivity, manage costs, and/or expand customer services.

MTC devices may use a variety of wired and/or wireless communication technologies. For example, MTC devices may communicate with a network over various wireless cellular technologies, such as LTE and/or various wireless networking technologies (e.g., IEEE 802.11 (Wi-Fi), IEEE 802.16 (WiMAX), etc.). MTC devices may also communicate with one another using various peer-to-peer technologies such as LTE-Direct (LTE-D), Bluetooth, ZigBee, and/or other ad-hoc or mesh network technologies. The expansion of multiple access wireless networks around the world has made it far easier for MTC communication to take place and has lessened the amount of power and time for information to be communicated between machines.

Further, MTC devices generally must be power efficient and low-cost; therefore, they usually are not equipped with a power amplifier (PA) or they may have a small PA. MTC devices may use a narrow frequency band transceiver. As a result, MTC devices may have link budget challenges, particularly for up-link communications to a base station or eNB, for example.

SUMMARY

The described features generally relate to one or more improved systems, methods, and/or apparatuses for improving uplink communications of a machine type communication (MTC) device by relaying communications through a first device, such as a mobile device or user equipment (UE), to a second device, such as a base station or Evolved-NodeB (eNB). In one aspect, a relay device may participate in a discovery process to discover an MTC device. The relay device may then receive data from the discovered MTC device, such as through a peer-to-peer (P2P) link, and relay that data to a base station through a second communication link. In another aspect, an MTC device may participate in a discovery process with a first device, such as a relay mobile station or UE. The MTC device may then transmit data to the relay device for relaying to a second device, such as a base station. In some embodiments, the relay device may communicate with the MTC device via routing through the base station. Uplink communications from the MTC device to the base station may be relayed through a relay device, while downlink communications may be communicated directly from the base station to the MTC device. In this way, uplink communication budgets of MTC devices can be improved without modification to the MTC device and with minimized network impact.

In some embodiments, a method of wireless communication performed at a first device may include participating in a discovery process to discover a machine type communication (MTC) device. The first device may then receive data from the discovered MTC device and relay the data from the MTC device to a second device. In some cases the second device may be a cellular base station or a wireless local area network (WLAN) access point.

In some embodiments, the first device may establish a first peer-to-peer connection with the MTC device and a second connection with the second device.

In some embodiments, relaying data from the MTC device to the second device may include relaying uplink data from the MTC device to the second device. In some cases, the second device may communicate directly on a downlink with the MTC device.

In some embodiments, participating in the discovery process with the MTC device may include broadcasting, by the first device, a peer discovery signal to indicate availability to serve as a relay. The first device may then receive a request from the MTC device to serve as the relay, and in response, transmit a message to the MTC device to confirm that the first device will serve as the relay. In some cases, the first device may route the message confirming it will serve as a relay to the MTC device via the second device.

Participating in the discovery process with the MTC device may include receiving, by the first device, a peer discovery signal from the MTC device. The first device may then transmit a message that indicating it is available to serve as a relay to the MTC device. The first device may then receive a request from the MTC device to serve as the relay. In some cases, the first device may route the message confirming it will serve as a relay to the MTC device via the second device.

In other embodiments, a device for relaying MTC data may include a processor, a memory in electronic communication with the processor, and instructions stored in the memory, the instructions being executable by the processor to participate in a discovery process to discover a MTC device, receive data from the discovered MTC device; and relay data from the MTC device to a second device.

In some embodiments, the instructions executable by the processor may also enable the device to establish a first peer-to-peer connection with the MTC device, and establish a second connection with the second device.

In some embodiments, the instructions executable by the processor may also enable the device to transmit one or more messages to the MTC device via routing through the second device. In some cases, the second device may communicate directly on a downlink with the MTC device.

In other embodiments, a method of wireless communication performed by a MTC device may include participating in a discovery process with a first device, and transmitting data to the first device for relaying to a second device. In some cases the second device may be a cellular base station or a wireless local area network (WLAN) access point.

In some embodiments, the MTC device may establish a peer-to-peer connection with the first device. In some cases, transmitting data to the first device for relay to the second device may be over the established peer-to-peer connection.

In some embodiments, the MTC device may receive downlink communications directly from the second device.

In some embodiments, participating in the discovery process with the first device may include broadcasting, by the MTC device, a peer discovery signal to request the first device to serve as a relay. The MTC device may then receive a message indicating that the first device is available to serve as the relay from the first device. In some cases the MTC device ay receive the message from the first device via routing through the second device.

In some embodiments, participating in the discovery process with the first device may include receiving a peer discovery signal from the first device indicating that the first device is available to serve as a relay for the MTC device. The MTC device may then transmit a message to the first device confirming that the MTC has data to relay to the second device via the first device.

In other embodiments, a MTC device may include a processor, a memory in electronic communication with the processor, and instructions stored in the memory, the instructions being executable by the processor to participate in a discovery process with a first device, and transmit data to the first device for relaying to a second device.

In some embodiments, the instructions executable by the processor may also enable the MTC device to establish a peer-to-peer connection with the first device. In some cases, transmitting data to the first device for relay to the second device may be over the established peer-to-peer connection.

In some embodiments, the instructions executable by the processor may also enable the MTC device to receive one or more messages from the first device via routing through the second device. The instructions executable by the processor may also enable the MTC device to receive downlink communications directly from the second device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
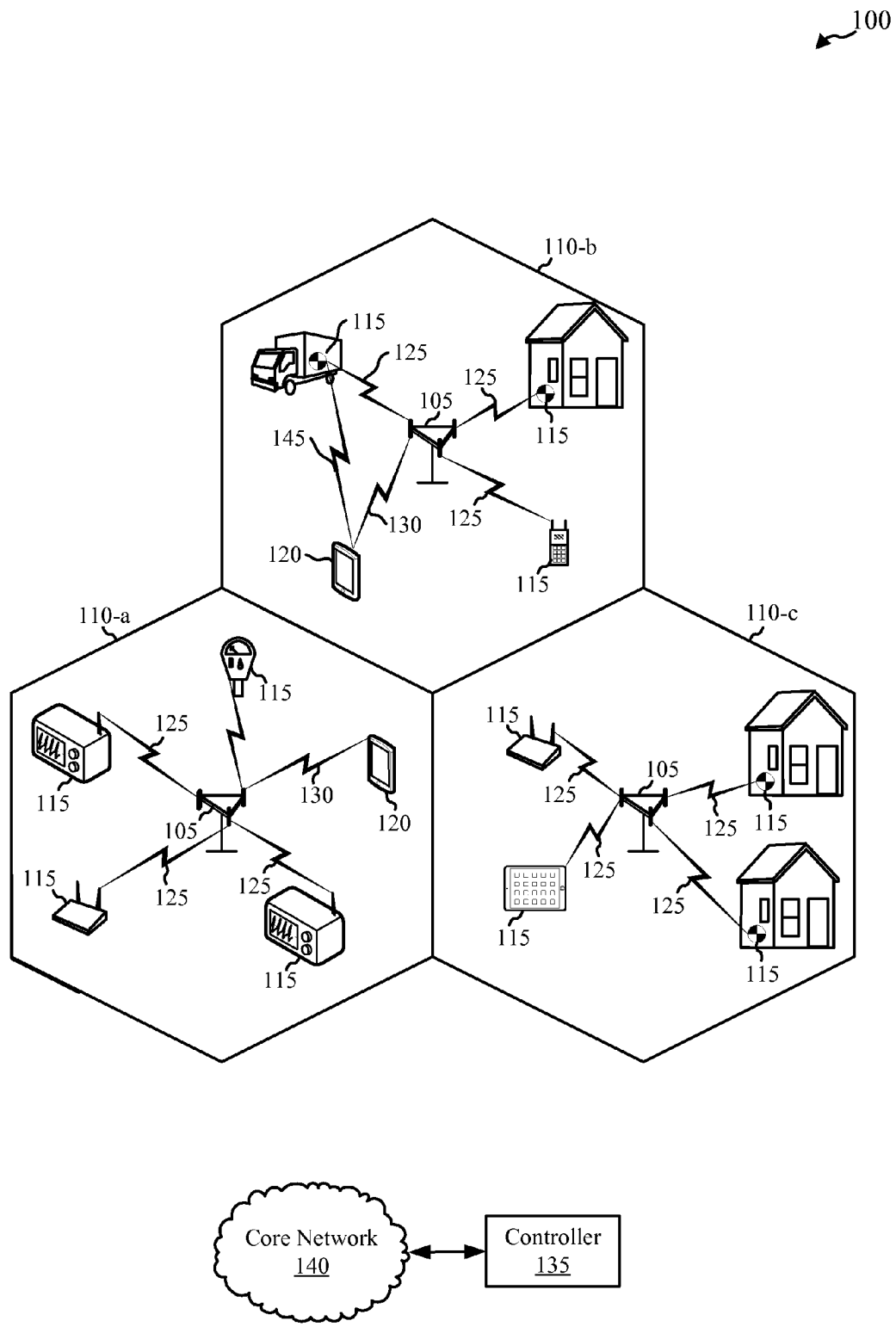
FIG. 1 shows a block diagram of a wireless communications system in accordance with various embodiments.

The described features generally relate to one or more improved systems, methods, and/or apparatuses for improving uplink communications of a machine type communication (MTC) device by relaying communications through a first device, such as a mobile device or user equipment (UE), to a second device, such as a base station or Evolved-NodeB (eNB). In one aspect, a relay device may participate in a discovery process to discover an MTC device. In some cases, the relay device may initiate the discovery process by broadcasting a peer discovery signal to indicate availability to serve as a relay. The relay device may receive a request to serve as a relay from an MTC device, for example if the MTC device has data to transmit to an MTC server through a base station. The relay device may transmit a message to the MTC device confirming that it will serve as a relay. In other cases, the MTC device may initiate the discovery process such that the relay device may receive a peer discovery signal from the MTC device. The relay device may then transmit a message indicating availability to serve as a relay to the MTC device. The relay device may subsequently receive a request from the MTC device to serve as a relay. In some embodiments, the relay device may communicate, e.g., transmit messages, to the MTC device by routing messages through a base station.

Once the relay relationship has been confirmed between the relay device and the MTC device, the relay device may then receive data from the discovered MTC device, such as through a peer-to-peer (P2P) link. The relay device may relay that data to a base station through a second communication link, such as a Long Term Evolution (LTE) link.

In another aspect, an MTC device may participate in a discovery process with a first device, such as a mobile station or UE, for example if the MTC device has data to communicate with an MTC server. In one aspect, the MTC device may initiate the discovery process by broadcasting a peer discovery signal to request that a device serve as a relay for MTC communications. The MTC device may receive a message from a device that received the peer discovery signal. The message may indicate that the device is available to serve as a relay device. In another aspect, a candidate relay device may initiate the discovery process. In this case, the MTC device may receive a peer discovery signal from the device, with the peer discovery signal indicating that the device is available to serve as a relay device. In response, the MTC device may transmit a message confirming that the MTC has data to relay to another device, which may be a base station, through the relay device. In some embodiments, the relay device may communicate, e.g., transmit messages, to the MTC device by routing messages through the base station.

After the MTC device and the relay device have discovered each other, the MTC device may transmit data to the relay device for relaying to the other device. In some cases, the MTC device may establish a peer-to-peer (P2P) connection with the relay device and transmit data to be relayed to the relay device over the P2P connection. In either aspect, the relay device may communicate routing information to the base station to enable downlink communication between the base station and the MTC device. In some embodiments, uplink communications from the MTC device to the base station may be relayed through the relay device, while downlink communications may be communicated directly from the base station to the MTC device.

Thus, the following description provides examples, and is not limiting of the scope, applicability, or configuration set forth in the claims. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105, communication devices 115, 120, a base station controller 135, and a core network 140 (the controller 135 may be integrated into the core network 140). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The base stations 105 may wirelessly communicate with the devices 115, 120 via a base station antenna (not shown). The base stations 105 may communicate with the devices 115, 120 under the control of the base station controller 135 via multiple carriers. Each of the base station 105 sites may provide communication coverage for a respective geographic area or cell. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area (or cell) for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115, 120 may be dispersed throughout the coverage areas 110. Each device 115, 120 may be stationary or mobile. In one configuration, the devices 115, 120 may be able to communicate with different types of base stations such as, but not limited to, macro base stations, pico base stations, and femto base stations, via links 125, 130, 145 respectively.

Some of the devices may be machine type communication (MTC) devices 115 that perform various functions, capture information, and/or communicate information with limited or no human intervention. For example, MTC devices 115 may include sensors and/or meters for monitoring and/or tracking other devices, environmental conditions, etc. MTC devices 115 may be standalone devices or, in embodiments, MTC devices 115 may be modules incorporated in other devices, such as relay devices 120, which may in some cases be mobile devices or user equipments (UEs). For example, relay devices 120 such as smart phones, cellular phones and wireless communications devices, personal digital assistants (PDAs), tablets, other handheld devices, netbooks, ultra-books, smartbooks, notebook computers, surveillance cameras, handled medical scanning devices, home appliances, etc. may include one or more MTC device modules. In other cases, relay devices 120 may not implement any MTC functionality. In the ensuing description, various techniques are described as applied to communications and processing for a system 100 including a network and one or more MTC devices 115. It should be understood that the described techniques may be advantageously applied to other devices such as those incorporating MTC devices 115 and/or other wireless communication devices.

In some implementations, an MTC device 115 may communicate with a base station 105 by relaying information through a relay device 120. In some cases, the MTC device may relay uplink data to a base station 105 through link 145 to a relay device 120, and the relay device 120 may then forward the MTC data to the base station 105 via link 130. The base station 105 may communicate on the downlink directly with the MTC device 115 via link 125.

The information collected by the MTC devices 115 may be transmitted across a network that includes components of system 100 to a back-end system, such as a server. The transmission of data to/from the MTC devices 115 may be routed through the base stations 105. The base stations 105 may communicate with the MTC devices 115 on a forward or downlink link for transmitting signaling and/or information to the MTC devices 115 and a reverse or uplink link for receiving signaling and/or information from the MTC devices 115.

In one example, the network controller 135 may be coupled to a set of base stations 105 and provide coordination and control for these base stations 105. The controller 135 may communicate with the base stations 105 via a backhaul (e.g., core network 140). The base stations 105 may also communicate with one another directly or indirectly and/or via wireless or wireline backhaul.

The different aspects of system 100, such as the MTC devices 115, the relay devices 120, the base stations 105, the core network 140, and/or the controller 135 may be configured for improving uplink communications of an MTC device 115 by relaying communications through a relay device 120 to a second device, such as a base station 105 via links 145 and 130.

In one aspect, a relay device 120 may participate in a discovery process to discover an MTC device 115, for example if the MTC device 115 has data to transmit to a base station 105, if the relay device 120 detects an MTC device 115 that has data to transmit, and/or if a base station 105 has data to communicate with the MTC device 115. In some cases, the relay device 120 may initiate the discovery process by broadcasting a peer discovery signal to indicate availability to serve as a relay. The relay device 120 may then receive a request to serve as a relay from an MTC device 115. The relay device 120 may transmit a message to the MTC device 115 confirming that it will serve as a relay.

In other cases, the MTC device 115 may initiate the discovery process such that the relay device 120 may receive a peer discovery signal from the MTC device 115. The relay device 120 may then transmit a message indicating availability to serve as a relay to the MTC device 115. The relay device 120 may subsequently receive a request from the MTC device 115 to serve as a relay. In some embodiments, the relay device 120 may communicate, e.g., transmit messages, to the MTC device 115 by routing messages through a base station 105, such as via links 130 and 125.

Once the relay relationship has been confirmed between the relay device 120 and the MTC device 115, the relay device 120 may then receive data from the discovered MTC device, such as through a peer-to-peer (P2P) link 145, and relay that data to a base station through a second communication link 130, which may be a Long Term Evolution (LTE) link.

In another aspect, an MTC device 115 may participate in a discovery process with a first device 120, such as a mobile station or UE, for example if the MTC device 115 has data to communicate with a base station 105. In one aspect, the MTC device 115 may initiate the discovery process by broadcasting a peer discovery signal to request that a device serve as a relay for MTC communications. The MTC device 115 may receive a message from a device 120 that received the peer discovery signal. The message may indicate that the device 120 is available to serve as a relay device. In another aspect, the device 120 may initiate the discovery process. In this case, the MTC device 115 may receive a peer discovery signal from the device 120, with the peer discovery signal indicating that the device 120 is available to serve as a relay device. In response, the MTC device 115 may transmit a message confirming that the MTC device 115 has data to relay to a base station 105 for instance, through the relay device 120.

After the MTC device 115 and the relay device 120 have discovered each other, the MTC device 115 may transmit data to the relay device 120 for relaying to a base station 105. In some cases, the MTC device 115 may establish a peer-to-peer (P2P) connection 145 with the relay device 120 and transmit data to be relayed to the relay device 120 over the P2P connection 145. The relay device 120 may communicate with the MTC device 115 via routing through the base station via links 145, 130, and 125. In some embodiments, uplink communications from the MTC device 115 to the base station 105 may be relayed through the relay device 120 via links 145 and 130, while downlink communications may be communicated directly from the base station 105 to the MTC device 115 via link 125. In this way, uplink communication budgets of MTC devices 115 can be improved without modification to MTC devices 115 themselves and with minimized impact to network 100.

Figure 2:
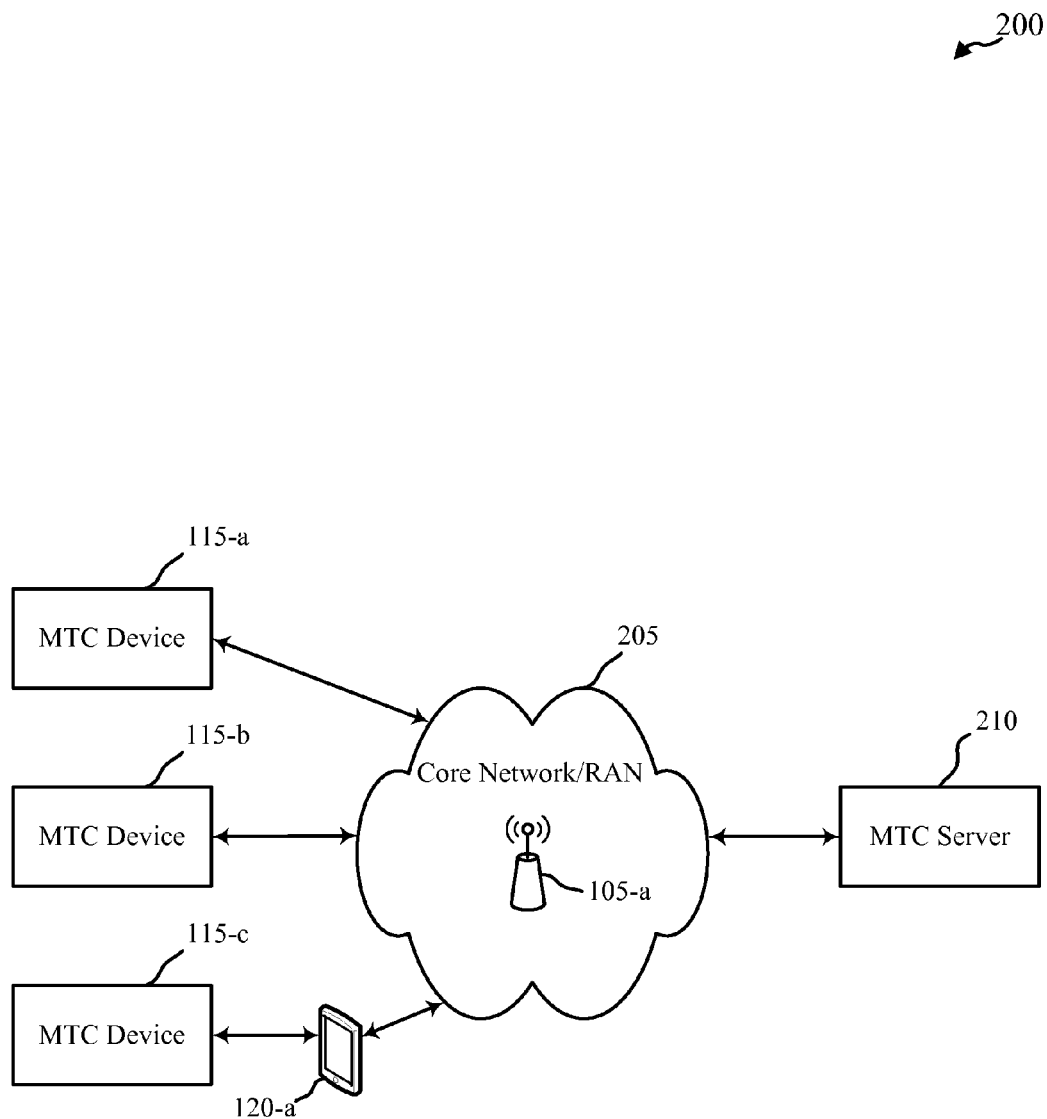
FIG. 2 illustrates an example of a wireless communication system implementing MTC service in accordance with various embodiments.

FIG. 2 illustrates an example of a wireless communication system 200 including a Radio Access Network (RAN) or Core Network 205 implementing a machine type communication service according to one aspect. The system 200 may include any number of MTC devices 115, however for ease of explanation only three MTC device 115-a, 115-b, and 115-c are shown in communication with an MTC server 210. Communications between the server 210 and MTC devices 115-a, 115-b, and 115-c may be routed through a base station 105-a that may be considered part of the Core Network/RAN 205. The base station 105-a may be an example of the base stations 105 illustrated in FIG. 1. The MTC devices 115-a, 115-b, and 115-c may be examples of the MTC devices 115 illustrated in FIG. 1, or may be examples of modules of the relay devices 120 illustrated in FIG. 1. One skilled in the art would understand that the quantity of MTC devices 115, Core Networks/RANs 205, and MTC servers 210 shown in FIG. 2 is for illustration purposes only and should not be construed as limiting.

The wireless communication system 200 may be operable to facilitate machine type communication between one or more MTC devices 115 and/or one or more base stations 105-a. Machine type communication may include communications between one or more devices without human intervention. In one example, machine type communication may include the automated exchange of data between a remote machine, such as an MTC device 115-a, 115-b, 115-c, and a back-end IT infrastructure, such as the MTC server 210, without user intervention. The transfer of data from an MTC device 115-a, 115-b, 115-c to the MTC server 210 via the Core Network/RAN 205 (e.g., the base station 105-a) may be performed using reverse or uplink link communications. Data collected by the MTC devices 115-a, 115-b, 115-c (e.g., monitoring data, sensor data, meter data, etc.) may be transferred to the MTC server 210 on the uplink communications.

The transfer of data from the MTC server 210 to an MTC device 115-a via the base station 105-a may be performed via forward or downlink link communications. The forward link may be used to send instructions, software/firmware updates, and/or messages to the MTC devices 115-a, 115-b, 115-c. The instructions may instruct the MTC devices 115-a, 115-b, 115-c to remotely monitor equipment, environmental conditions, etc. Machine type communication may be used with various applications such as, but not limited to, remote monitoring, measurement and condition recording, fleet management and asset tracking, in-field data collection, distribution, physical access control, and/or storage, etc. The base station 105-a may generate one or more forward link frames with a small number of channels to transmit instructions, software/firmware updates, and/or messages. The various MTC devices 115-a, 115-b, 115-c may wake up to monitor a specific frame when instructions or other data is included on a channel of that frame.

In one embodiment, the behavior of the MTC devices 115-a, 115-b, 115-c may be pre-defined. For example, the day, time, etc. to monitor another device and transmit the collected information may be pre-defined for an MTC device 115-a, 115-b, 115-c. For example, the MTC device 115-a may be programmed to begin monitoring another device and collect information about that other device at a first pre-defined time period. The MTC device 115-a may also be programmed to transmit the collected information at a second pre-defined time period. The behavior of an MTC device 115-*a* may be remotely programmed to the device 115-*a*.

in some embodiments, one or more MTC devices 115-*a*, 115-*b*, 115-*c* may have data to send to the MTC server 210, for example through the core network/RAN 205 via base station 105-*a*. In other cases, the MTC server 210 may request data from the one or more MTC devices 115-*a*, 115-*b*, 115-*c*. In either case, an MTC device 115-*a*, 115-*b*, 115-*c* may have uplink data to communicate to a base station 105-*a* to be relayed to the MTC server 210. Given that MTC devices 115-*a*, 115-*b*, 115-*c* may be narrow frequency band devices and/or may have limited power resources, they may not be able to effectively and timely communicate data on the uplink to a base station 105-*a* and/or the MTC server 210. Communications, and particularly uplink communications of an MTC device, for example MTC device 115-*c* may be improved by relaying data communications to a base station 105 and/or MTC server 210 through a relay device 120-*a*. These relay techniques will be described in further detail below in reference to FIGS. 3-6.

Figure 3:
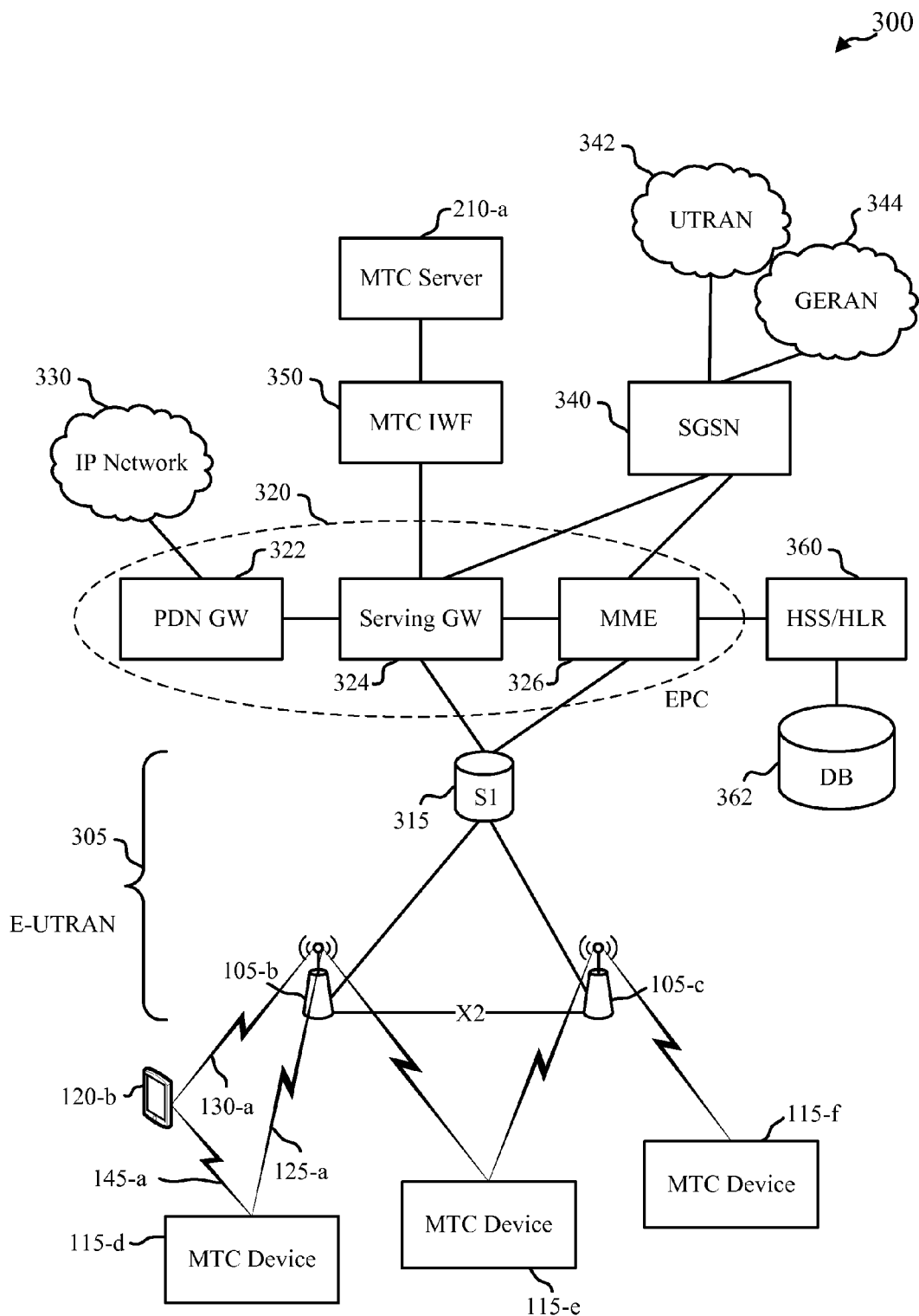
FIG. 3 illustrates another example of a wireless communication system implementing MTC service in accordance with various embodiments.

FIG. 3 illustrates an example of a wireless communications system 300 implementing a machine type communication service over an LTE/LTE-Advanced network in accordance with various embodiments. The LTE/LTE-A network may include Evolved Universal Terrestrial Radio Access Network (E-UTRAN) 305 and Evolved Packet Core (EPC) 320. The LTE E-UTRAN 305 and EPC 320 may be configured for supporting end-to-end packet-switched communications. EPC 320 may include a Packet Data Network (PDN) Gateway 322. The PDN Gateway 322 may be connected to one or more Internet Protocol (IP) Networks 330. IP Networks 330 may include Operator IP Networks as well as external IP Networks. For example, IP Networks 330 may include the Internet, one or more Intranets, an IP Multimedia Subsystem (IMS), and a Packet Switched (PS) Streaming Service (PSS). The PDN Gateway 322 may provide UE IP address allocation as well as other functions. The EPC 320 may interconnect with other access networks using other Radio Access Technologies (RATs). For example, EPC 320 may interconnect with UTRAN 342 and/or GERAN 344 via one or more Serving GPRS Support Nodes (SGSNs) 340.

EPC 320 may include one or more Serving Gateways 324 and/or Mobility Management Entities (MME) 326. The Serving Gateway 324 may handle the interface to E-UTRAN 305 and provide a communication point for inter-RAT mobility (e.g., handover to UTRAN 342 and/or GERAN 344, etc.). Generally, the MME 326 may provide bearer and connection management while the Serving Gateway 324 may transfer user IP packets between base stations 105 and other network end-points (e.g., PDN GW 322, etc.). For example, MME 326 may manage intra-RAT mobility functions (e.g., Serving Gateway selection) and/or UE tracking management. The Serving Gateway 324 and the MME 326 may be implemented in one physical node of EPC 320 or in separate physical nodes. A Home Subscriber Service (HSS) and/or home location register (HLR) node 360 may provide service authorization and/or user authentication for UEs. HSS/HLR node 360 may communicate with one or more databases 362.

E-UTRAN 305 may include one or more base stations or eNBs 105-*b*, 105-*c* which provide user and control plane protocol terminations for MTC devices 115-*d*, 115-*e*, 115-*f*, and/or a relay device or UE 120-*b* over the air interface of the LTE network. eNBs 105-*b*, 105-*c* may be connected with an X2 interface for intra-eNB communication. Base station 105-*b*, 105-*c* may be connected to Serving Gateway 324 and/or MME 326 over an S-1 interface 315 for communicating data traffic and/or control plane information. The MTC devices 115-*d*, 115-*e*, 115-*f*, and/or the relay device 120-*b* may be configured to collaboratively communicate with multiple base stations 105 through, for example, Multiple Input Multiple Output (MIMO), Coordinated Multi-Point (CoMP), or other schemes as described in more detail below.

In some embodiments, wireless communications network 300 includes an MTC inter-working function (IWF) module 350, which may provide an interface between EPC 320 and one or more external MTC Servers 210-*a* for providing MTC service within the LTE network. MTC server 210-*a* may be an example of MTC server 210 of FIG. 2. MTC server 210-*a* may be operated by the proprietor of MTC devices 115 and may perform functions associated with deployment of MTC devices 115 such as receiving and processing MTC device data. MTC server 210-*a* may be connected directly to EPC 320 or may be connected through MTC IWF module 350 and/or other networks such as the Internet. MTC IWF module 350 may be implemented in one or more existing physical nodes of the EPC 320 (e.g., Serving Gateway 324, etc.), or in a separate physical node connected to EPC 320.

Wireless communications network 300 may further support relay of communications from an MTC device 115-*d* to a base station 105-*b* through a relay device 120-*b*. For example, the relay device 120-*b* may participate in a discovery process with an MTC device 115-*d*. After the relay device 120-*b* and the MTC device 115-*d* have discovered each other, the relay device 120-*b* may receive data from the discovered MTC device 115-*d* over link 145-*a*, which may be a P2P link, such as implementing LTE-D, Wi-Fi-Direct, or other P2P technology, for example. The relay device 120-*b* may then forward or relay the MTC data to base station 105-*b* over link 125-*a*, which may implement LTE, or other WLAN technology. In other embodiments, the MTC device 115-*d* may participate in a discovery process with the relay device 120-*b*. Once discovery is complete, the MTC device 115-*d* may transmit data to the relay device 120-*b* via link 145-*a* to be relayed to the base station 105-*b* via link 125-*a*. In some embodiments, the relay device 120-*b* may communicate, e.g., transmit messages to the MTC device 115-*d* through the base station 105-*b*, such as through links 130-*a* and 125-*a*.

Figure 4:
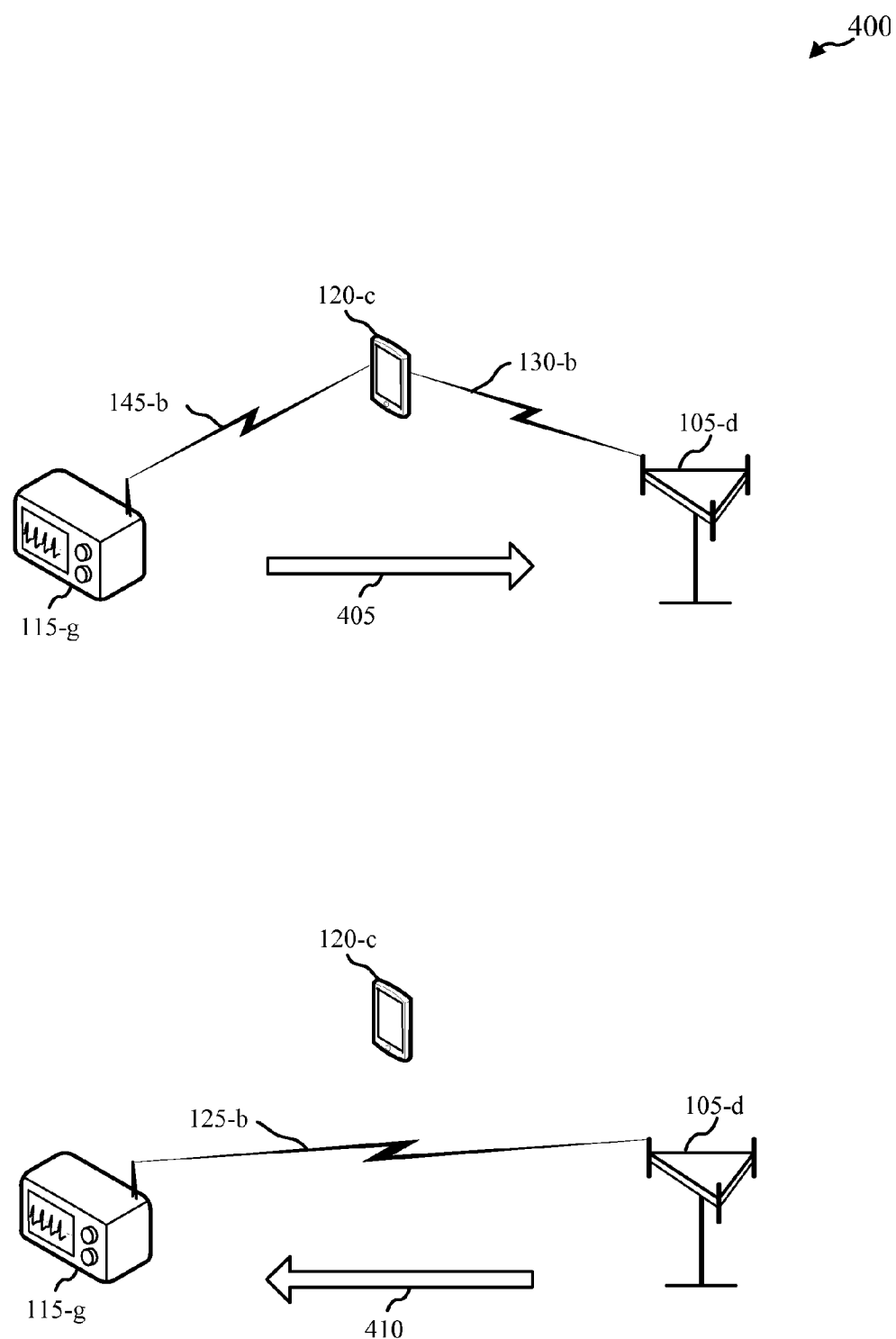
FIG. 4 illustrates an example of wireless communications of an MTC device in accordance with various embodiments.

FIG. 4 illustrates an example of wireless communications 300 between an MTC device 115-*g*, a relay device 120-*c*, and a base station 105-*d* in accordance with various embodiments. The MTC device 115-*g* may be an example of the MTC device 115 of FIGS. 1, 2, and/or 3. The relay device 120-*c* may be an example of the relay device or UE 120 of FIGS. 1 and/or 3. The base station 105-*d*, which may be a cellular base station, eNB, or WLAN access point, may be an example of base station 105 of FIGS. 1, 2, and/or 3. The MTC device 115-*g* may communicate with base station 105-*d* on the uplink 405 and on the downlink 410.

In some embodiments, the MTC device 115-*g* may communicate on the uplink 405 with base station 105-*d* through relaying communications through a relay device 120-*c*. The MTC device 115-*g* and the relay device 120-*c* may participate in a discovery process. Once discovery is complete, the relay device 120-*c* may receive data from the discovered MTC device 115-*g* via link 145-*b*, which may be a LTE-D link, to be relayed to the base station 105-*d*. After receiving the MTC data from the MTC device 115-*g*, the relay device 120-*c* may then forward the MTC data to the base station 105-*d* via link 130-*b*, which may be an LTE link.

From the perspective of the MTC device 115-*g*, the process for relaying data through the relay device 120-*c* to the base station 105-*d* may be described as follows. The MTC device 115-*g* and the relay device 120-*c* may participate in a discovery process. Once discovery is complete, the MTC device may transmit data to be relayed to the base station 105-*d* which in turn may be relayed to an MTC server, such as MTC server 210 as described above in reference to FIGS. 2 and/or 3. The MTC device 115-*g* may transmit the data first to the relay device 120-*c* via link 145-*b*, which may be a P2P link, such as an LTE-D link or other type of WLAN link, such as a WiFi-Direct link, to be relayed to the base station 105-*d*. The relay device 120-*c* may then forward the MTC data to the base station 105-*d* via link 130-*b*, which may be a LTE or other WLAN link.

In some embodiments, the base station 105-*d* may communicate on the downlink 410 directly with the MTC device 115-*g*, such as over link 125-*b*. In some cases, link 125-*b* may be an LTE link, as described above, or may implement another radio access technology, such as WLAN, 3G, etc. In some cases, by allowing direct downlink communication 410 between the MTC device 115-*g* and the base station 105-*d*, the impact on the network, such as network 100, may be minimized. Impact on the network may be minimized by, for example, utilizing less resources of a relay device 120-*c*.

It should be appreciated that in some cases, it may be beneficial for the MTC device 115-*g*, relay device 120-*c*, and/or base station 105-*d* for downlink communications between the base station 105-*d* and the MTC device 115-*g* to also be relayed through the relay device 120-*c*.

Figure 5:
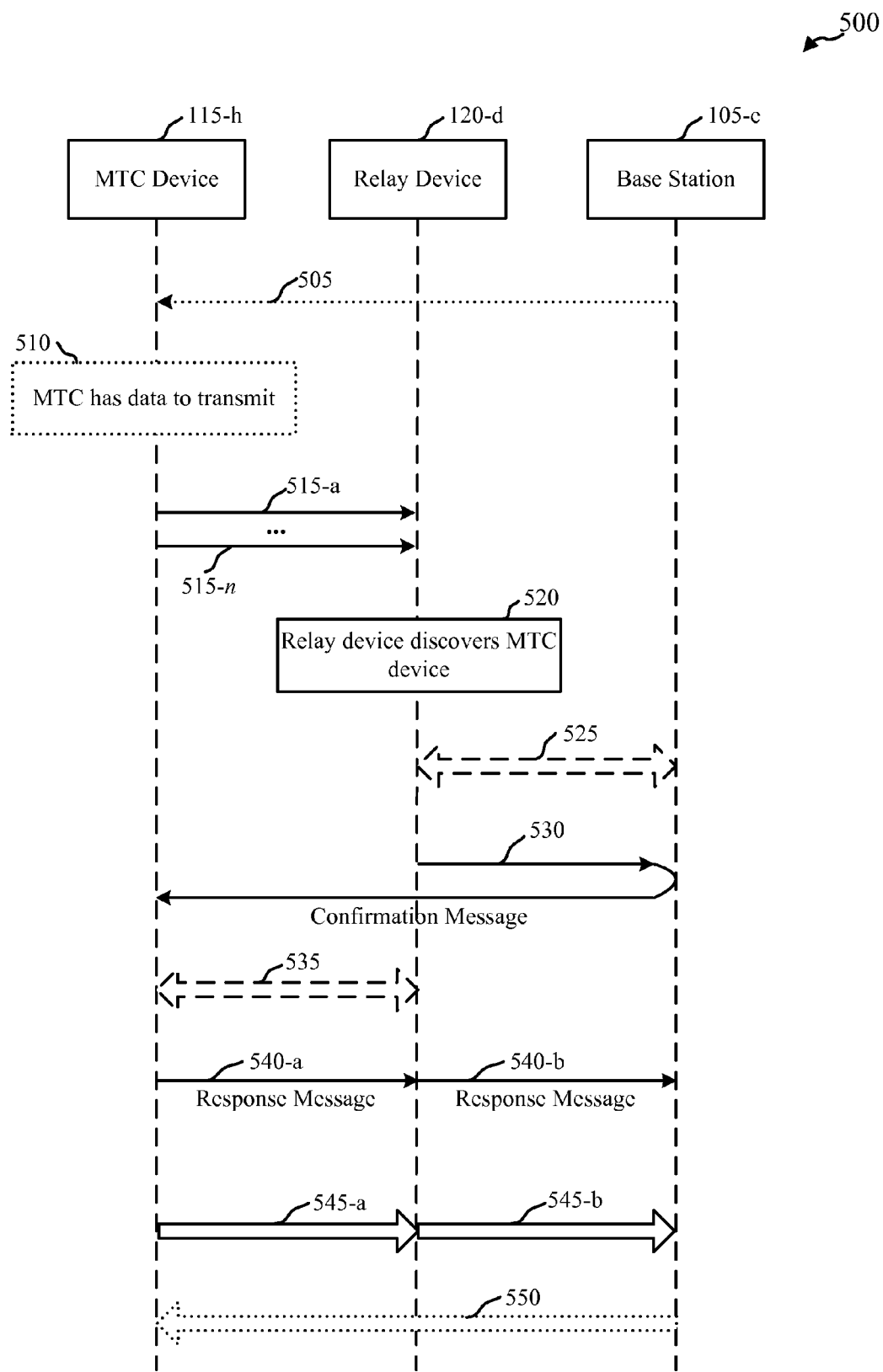
FIG. 5 shows a flow diagram for relaying communications of an MTC device through a relay device to a base station in accordance with various embodiments.

Turning next to FIG. 5, a flow diagram 500 illustrates an example of an MTC device 115-*h* relaying communications to a base station 105-*e* through a relay device 120-*d* in accordance with various embodiments. The MTC device 115-*h* may be an example of the MTC device 115 of FIGS. 1, 2, 3, and/or 4. The relay device 120-*d* may be an example of the relay device or UE 120 of FIGS. 1, 3, and/or 4. The base station 105-*e*, which may be a cellular base station, eNB, or WLAN access point, may be an example of base station 105 of FIGS. 1, 2, 3, and/or 4.

In some embodiments, an MTC server 210 may, through base station 105-*e*, transmit one or more messages 505 to the MTC device 115-*h*, for example, to request that the MTC device 115-*h* send data to the MTC server 210 through base station 105-*e*. The data, for instance may include sensor or related data. In other cases, the MTC server 210 through base station 105-*e*, may notify the MTC device 115-*h* that it has have software updates, revised scheduling of MTC reporting, or other operation information to convey to the MTC device 115-*h*. The base station 105-*e* may transmit one or more messages 505 to the MTC device 115-*h* indicating a need, by the base station 105-*e* and/or the MTC server 210, to communicate with the MTC device 115-*h*. The MTC device 115-*h* may then transmit or broadcast one or more discovery signals 515-*a* to 515-*n*, such as one or more peer discovery signals, to establish a relay link with a relay device 120-*d*.

In other cases, the MTC device 115-*h* may have data to transmit 510 to an MTC server 210, such as through a base station 105-*e*. In some cases, the MTC device 115-*h* may have data to transmit 510 and may be messaged by the base station 105-*e* concurrently. In either case, the MTC device 115-*h* may then broadcast a discovery signal 515-*a* to 515-*n* until discovered by a relay device 120-*d*. The relay device 120-*d* may then discover 520 the MTC device 115-*h*. In some cases, if the MTC device 115-*h* is not discovered within a certain time period, for example 100 seconds, the MTC device 115-*h* may stop broadcasting a discovery signal 515, and may broadcast a discovery signal 515 at another time. After the relay device 120-*d* discovers 520 the MTC device 115-*h*, the relay device 120-*d* may establish a link 525, such as an LTE link, with the base station 105-*e*. Once the link 525 is established, the relay device 120-*d* may then confirm that it will act as a relay for the MTC device 115-*h* by routing a confirmation message 530 through the base station 105-*e* to the MTC device 115-*h*, such as via links 130 and 125 described above in reference to FIGS. 1 and/or 3. In this way, the MTC device 115-*h* may receive the confirmation message 530 from the base station 105-*e*, as it may be configured to receive other messages from the base station 105-*e*. This may also give control to the base station 105-*e* over communications with the MTC device 115-*h*.

In some cases, the relay device 120-*d* may be pre-set to serve as a relay, or a user of the relay device 120-*d* may confirm availability to serve as a relay, such as via an interface of the relay device 120-*d*. In other cases, the relay device 120-*d* may communicate a confirmation message directly with the MTC device 115-*h*, for example through link 145 as described above in reference to FIGS. 1, 3, and/or 4.

The MTC device 115-*h* and the relay device 120-*c* may then establish a link 535 between them. In some cases, link 535 may be referred to as an access link, whereas link 525 may be referred to as a relay link. The MTC device 115-*h* may then respond 540 to the base stations 105-*e*'s initial message 505, by first sending a response message 540-*a* to the relay device 120-*d*, where the relay device 120-*d* may then forward the response message 540-*b* to the base station 105-*e*. After the relay relationship has been confirmed and established, such as through access link 535 and relay link 525, the MTC device 115-*h* may then relay uplink communications 545 to the base station 105-*e* through the relay device 120-*d*. This may be accomplished by first transmitting the uplink data 545-*a* to the relay device 120-*d*, with the relay device 120-*d* then forwarding the MTC data 545-*b* to the base station 105-*e*. In some embodiments, access link 535 and relay link 525 may be examples of links 145 and 130 as described above in reference to FIGS. 1, 3, and/or 4. Furthermore, transmission of response message 540-*a* and MTC data 545-*a* from the MTC device 115-*h* to the relay device 120-*d* may be accomplished over link 145 as described above in reference to FIGS. 1, 3, and/or 4. Similarly, transmission of response message 540-*b* and MTC data 545-*b* from the relay device 120-*d* to the base station 105-*e* may be accomplished over link 130 as also described above in reference to FIGS. 1, 3, and/or 4.

In some embodiments, such as where the base station 105-*e*, with instructions from an MTC server 210, messages 505 the MTC device 115-*h*, the base station 105-*e* may then transmit updates, or other operation information 550 directly to the MTC device 115-*h*. In some cases, the base station 105-*e* may transmit other messages or data 550 directly to the MTC device 115-*h*.

Figure 6:
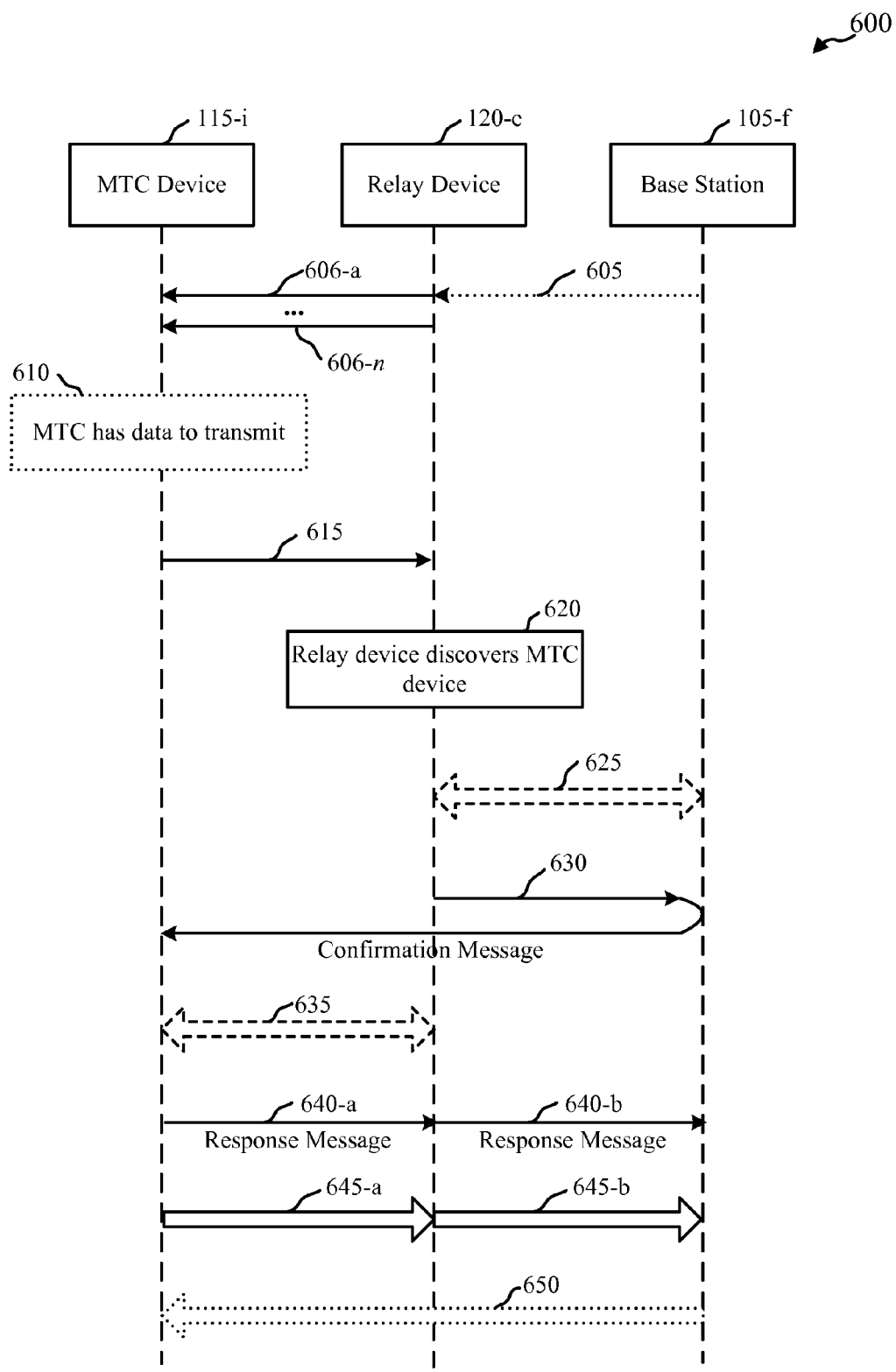
FIG. 6 shows another flow diagram for relaying communications of an MTC device through a relay device to a base station in accordance with various embodiments.

Turning next to FIG. 6, a flow diagram 600 illustrates an example of an MTC device 115-*i* relaying communications to a base station 105-*f* through a relay device 120-*e* in accordance with various embodiments. The MTC device 115-*i* may be an example of the MTC device 115 of FIGS. 1, 2, 3, 4, and/or 5. The relay device 120-*e* may be an example of the relay device or UE 120 of FIGS. 1, 3, 4, and/or 5. The base station 105-*f*, which may be a cellular base station, eNB, or WLAN access point, may be an example of base station 105 of FIGS. 1, 2, 3, 4, and/or 5.

In some embodiments, a relay device 120-e that is configured to act as a relay for MTC communications, may broadcast one or more discovery signals 606-a to 606-n, such as one or more peer discovery signals, to the MTC device 115-i. This may be done by the relay device 120-e periodically or when, for instance, the relay device 120-e detects an MTC device 115-i is nearby. In other cases, an MTC server 210 may, through base station 105-f transmit one or more messages 605 to the relay device 120-e to then forward to the MTC device 115-i. After receiving message 605 from the base station 105-f, the relay device 120-e may transmit one or more discovery signals 606-a to 606-n to the MTC device 115-i to establish a connection to communicate the information from the base station 105-f to the MTC device 115-i.

In some embodiments, the MTC device 115-i may have data to transmit 605 prior to, concurrently, or shortly after receipt of the discovery signal(s) 606 sent from the relay device 120-e. In other cases, the MTC device 115-i may not have data to transmit when or proximate in time to when it receives the discovery signal 606 from the relay device 120-e. In either case, the MTC device 115-i may then decide to respond 615 to the discovery request sent by the relay device 120-e to confirm the establishment of a link between the MTC device 115-i and the relay device 120-e.

The relay device 120-e may then discover 620 the MTC device 115-i, establish link 625 with the base station 105-f, confirm that it will act as a relay for MTC device 115-i by routing a confirmation message 630 through the base station 105-f to the MTC device 115-i, and establish a link 635 with the MTC device 115-i, as similarly described above in reference to FIG. 5. The MTC device 115-i may then confirm with the base station 105-f that the relay link with the relay device 120-e has been established by sending a response message 640 and then communicate uplink data 645 to the base station 105-f, as similarly described in reference to FIG. 5. Sending the response message 640 to the base station 105-f may include first sending the message 640-a to the relay device 120-e, with the relay device 120-e then forwarding the message 640-b to the base station 105-f. Similarly, the uplink data may first be communicated 645-a to the relay device 120-e and then communicated 645-b by the relay device 120-e to the base station 105-f. Additionally, the base station 105-f may communicate on the downlink 650 directly with the MTC device 115-i.

In some cases, the link 625 established by the relay device 120-e with the base station 105-f may be an example of link 130 as described above in reference to FIGS. 1, 3, and/or 4. Establishment of link 635 between the MTC device 115-i and the relay device 120-e may be an example of link 145 as also described in reference to FIGS. 1, 3, and/or 4. Routing a confirmation message 630 by the relay device 120-e through the base station 105-f to the MTC device 115-i may be accomplished via links 130 and 125 described above in reference to FIGS. 1 and/or 3.

Figure 7:
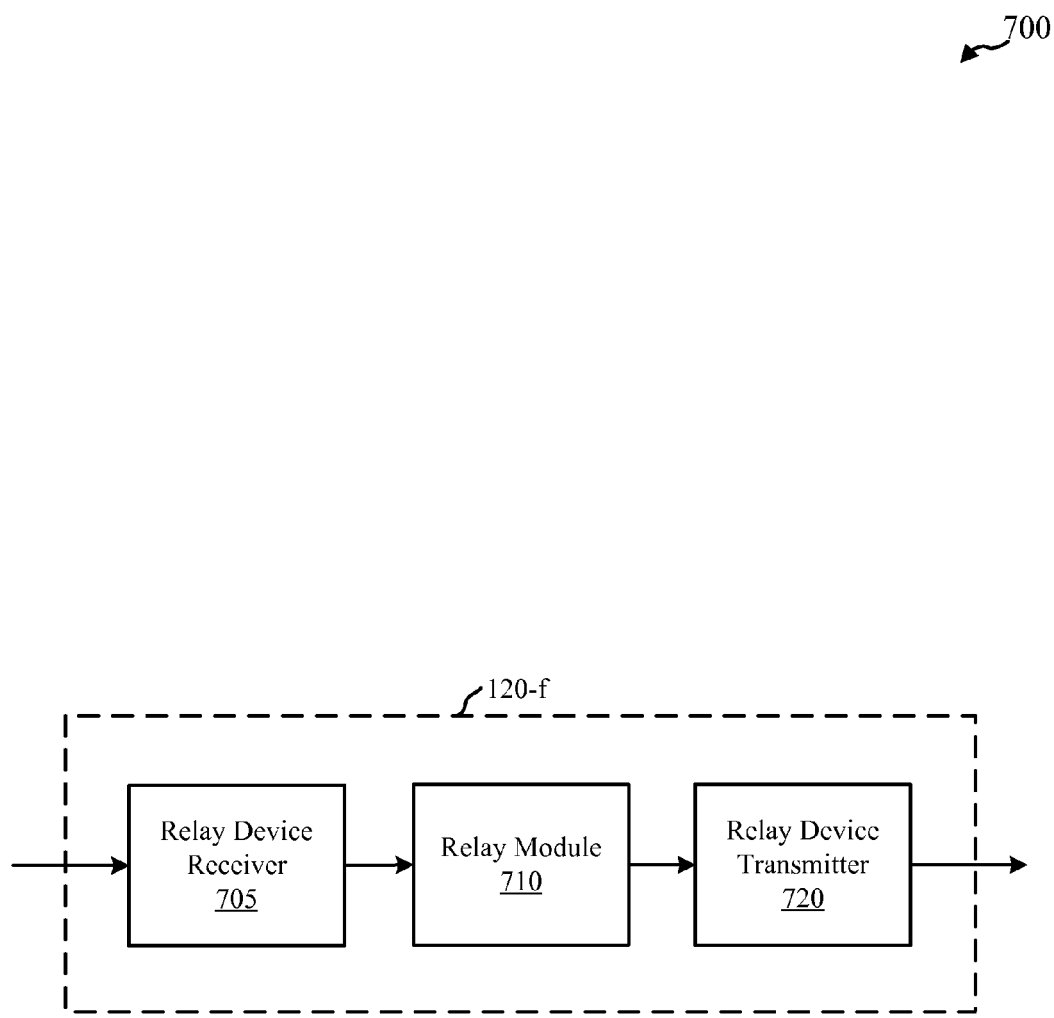
FIG. 7 is a block diagram illustrating a relay device for relaying MTC communications in accordance with various embodiments.

FIG. 7 shows a block diagram 700 of a device 120-f, which may be a relay device, for relaying communications from an MTC device 115 to a base station 105 in accordance with various embodiments. The device 120-f may be an example of one or more aspects of the relay device 120 described above with reference to FIGS. 1, 3, 4, 5, and/or 6. The device 120-f may also be a processor. The device 120-f may include a relay device receiver 705, a relay module 710, and/or a relay device transmitter 715. Each of these components may be in communication with each other.

The relay device receiver 705 may receive information such as packet, data, and/or signaling information regarding what the device 120-f has received or transmitted. The received information may be utilized by the relay module 710 for a variety of purposes. In some cases, the relay device receiver 705 may be configured to receive data or transmissions, for example from an MTC device 115, to further enable the various techniques described above for relaying communications from an MTC device 115 to a base station 105.

The relay device transmitter 715 may similarly transmit information such as packet, data, and/or signaling information from the device 120-f. In some cases, the relay device transmitter 715 may be configured to send data, such as MTC data, for relaying from an MTC device 115 to a base station 105 according to various embodiments described herein.

In particular, the relay device receiver 705 may receive one or more peer discovery signals from an MTC device 115. The relay device receiver 705 may then communicate the one or more peer discovery signals to the relay module 710. The relay module 710 may configure a response message indicating that the device 120-f is availability to serve as a relay for the MTC device 115 and communicate the response message to the relay device transmitter 715 to send to the MTC device 115. The relay device receiver 705 may subsequently receive a request from the MTC device to serve as a relay and communicate the request to the relay module 710. The relay module 710 may then confirm that the relay is to be established.

In other embodiments, device 120-f may initiate discovery with an MTC device 115. In this case, the relay module 710 may configure one or more peer discovery signals and communicate the discovery signals to the relay device transmitter 715 to send to the MTC device 115. The relay device receiver 705 may then receive a request to serve as a relay from an MTC device 115, for example if the MTC device 115 has data to transmit to a base station 105. The relay device receiver may then communicate the request to the relay module 710. The relay module 710 may configure a message indicating to the MTC device 115 that device 120-f will serve as a relay and communicate the message to the relay device transmitter to send to the MTC device 115.

In either of the MTC device 115 initiated or relay device 120-f initiated discovery embodiments, the relay module 710 via the relay device transmitter 715, may communicate, e.g., transmit messages, to the MTC device 115 by routing messages through a base station 105.

Once, the relay relationship has been confirmed between the relay device 120-f and the MTC device 115, the relay device receiver 705 may then receive data from the discovered MTC device 115, such as through a peer-to-peer (P2P) link, for relaying to a base station 105. The relay device receiver 705 may then communicate the data to the relay module 710, whereby the relay module 710 may configure the data to be transmitted to the base station 105. The relay module 710 may then communicate the data to be relayed to the relay device transmitter 715 to send to the base station 105.

Figure 8:
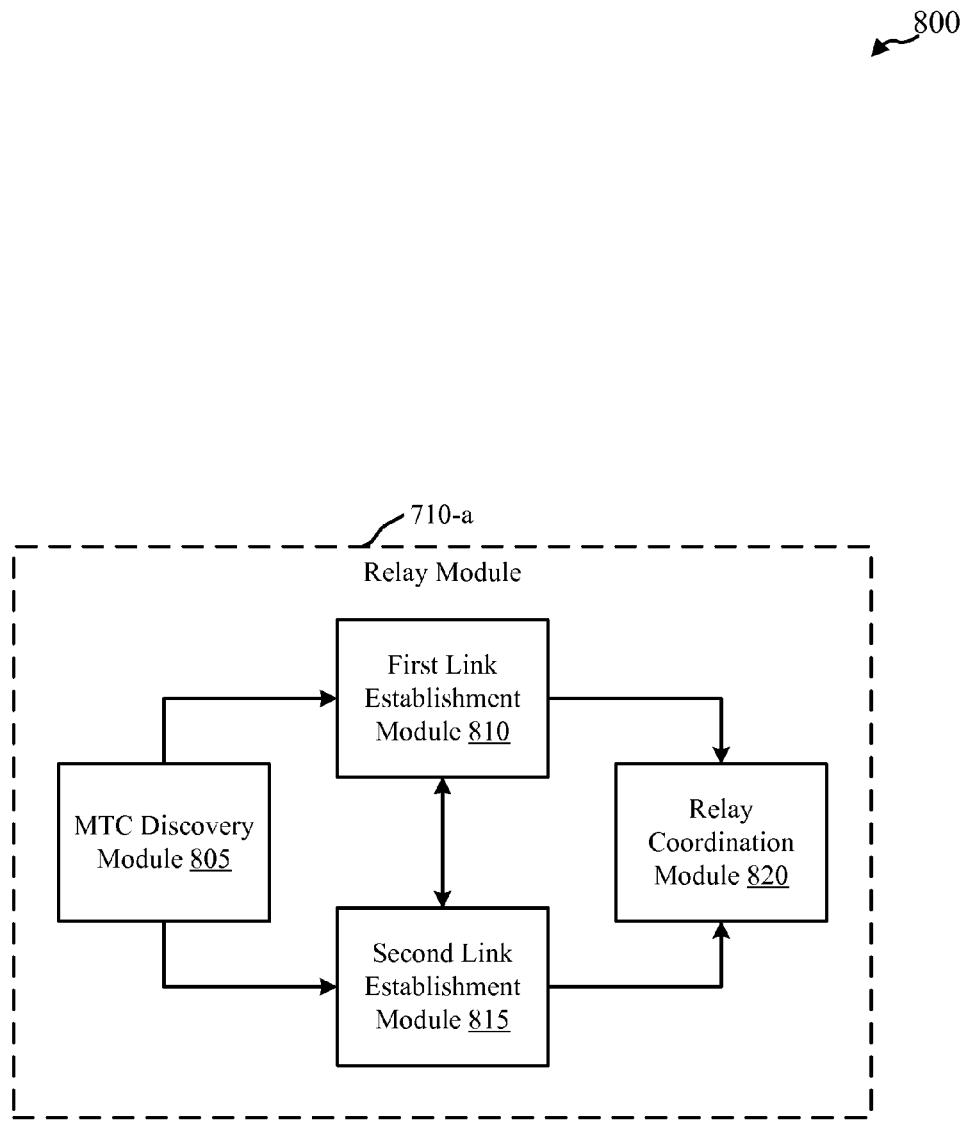
FIG. 8 is a block diagram illustrating one embodiment of a relay module in accordance with various embodiments.

FIG. 8 is a block diagram 800 illustrating one embodiment of a relay module 710-a. The relay module 710-a may be an example of the relay module 710 of FIG. 7. In one example, the relay module 710-a may include an MTC discovery module 805, a first link establishment module 810, a second link establishment module 815, and/or a relay coordination module 820.

In particular, the MTC discovery module 805 may, in communication with the relay device receiver 705 and transmitter 715 described above in reference to FIG. 7, and configure one or more discovery messages to be communicated to an MTC device 115 to establish a communication link with the MTC device 115. The communication link may be an example of link 145, 535, and/or 635 described above in reference to FIGS. 1, 3, 4, 5, and/or 6. As the discovery process has already been described in detail above in reference to FIGS. 5, 6, and 7, for the sake of brevity, it will not be described again here.

Once the device 120-f and the MTC device 115 have discovered each other, the MTC discovery module may 805 may communicate to the first link establishment module 810 and the second link establishment module 815 to initialize links for relaying data from the MTC device 115 to a base station 105. The first link establishment module 810 in conjunction with the relay device transmitter and receiver 715, 705, may then establish the first link with the MTC device 115. The first link may be an example of links 145, 535, and/or 635 described above in reference to FIGS. 1, 3, 4, 5, and/or 6. The second link establishment module 815, also in conjunction with the relay device transmitter and receiver 715, 705, may establish a second link with the base station 105. The second link may be an example of links 130, 525, and/or 625 described above in reference to FIGS. 1, 3, 4, 5, and/or 6.

Once the first and second links are established, the first and second link establishment modules 810, 815 may indicate to the relay coordination module 820 to begin relaying data from the MTC device 115 to the base station 105. The relay coordination module 820 may then receive data to be relayed from the MTC device 115 via the relay device receiver 705 and relay the data via the relay device transmitter 715 to the base station 105. The relay device receiver 705 may receive data from the MTC device 115 over the first link and may transmit data to the base station over the second link.

Figure 9:
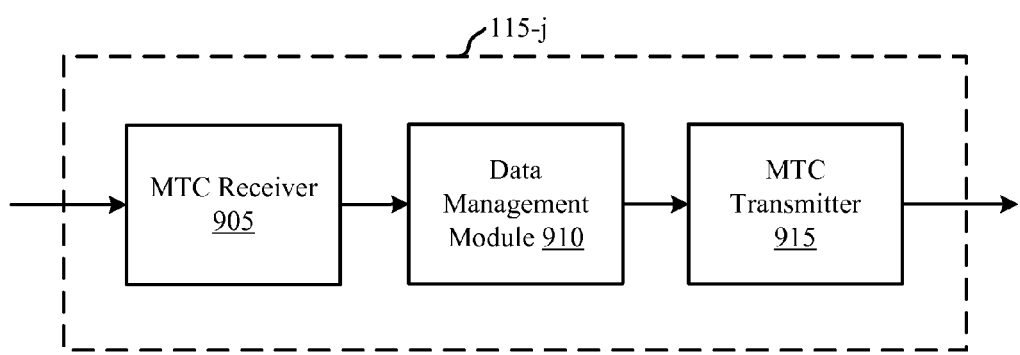
FIG. 9 is a block diagram illustrating an MTC device configured for utilizing a relay device in accordance with various embodiments.

FIG. 9 shows a block diagram 900 of a device 115-j, which may be an MTC device, for relaying communications to a base station 105 through a relay device 120 in accordance with various embodiments. The device 115-j may be an example of one or more aspects of the MTC device 115 described above with reference to FIGS. 1, 2, 3, 4, 5, and/or 6. The device 115-j may also be a processor. The device 115-j may include an MTC receiver 905, a data management module 910, and/or an MTC transmitter 915. Each of these components may be in communication with each other.

The MTC receiver 905 may receive information such as packet, data, and/or signaling information regarding what the device 115-j has received or transmitted. The received information may be utilized by the data management module 910 for a variety of purposes. In some cases, MTC receiver 905 may be configured to receive data or transmissions, for example from a relay device 120, to further enable the various techniques described above for relaying communications to a base station 105 through a relay device 120.

The MTC transmitter 915 may similarly transmit information such as packet, data, and/or signaling information from the device 115-j. In some cases, MTC transmitter 915 may be configured to send uplink data according to various embodiments described herein, such to a base station 105 through a relay device 120.

In particular, the MTC receiver 905 may be configured to receive one or more discovery signals from a relay device 120. The MTC receiver 905 may then communicate the one or more discovery signals to the data management module 910. The data management module 910 may then configure a response message to the one or more received discovery signals, such as to request the relay device 120 to serve a relay for uplink communications to a base station 105. The data management module 910 may then communicate the response message to the MTC transmitter 915 to transmit to the relay device 120.

In some cases, when, for instance, the MTC device 115-j initiates the discovery process with the relay device 120, the data management module 910 may configure one or more discovery signals, such as one or more peer discovery signals. The data management module 910 may communicate the discovery signals to the MTC transmitter 915 to broadcast to one or more relay devices 120. In this scenario, the MTC receiver 905 may then receive confirmation from the relay device 120 that it will serve as a relay.

In either case, once the discovery process between the MTC device 115-j and the relay device 120 is complete, the data management module 910 may compile and/or configure data to be relayed through the relay device 120 to a base station 105. The data management module 910 may then communicate this data to the MTC transmitter 915 to send to the relay device 120.

Figure 10:
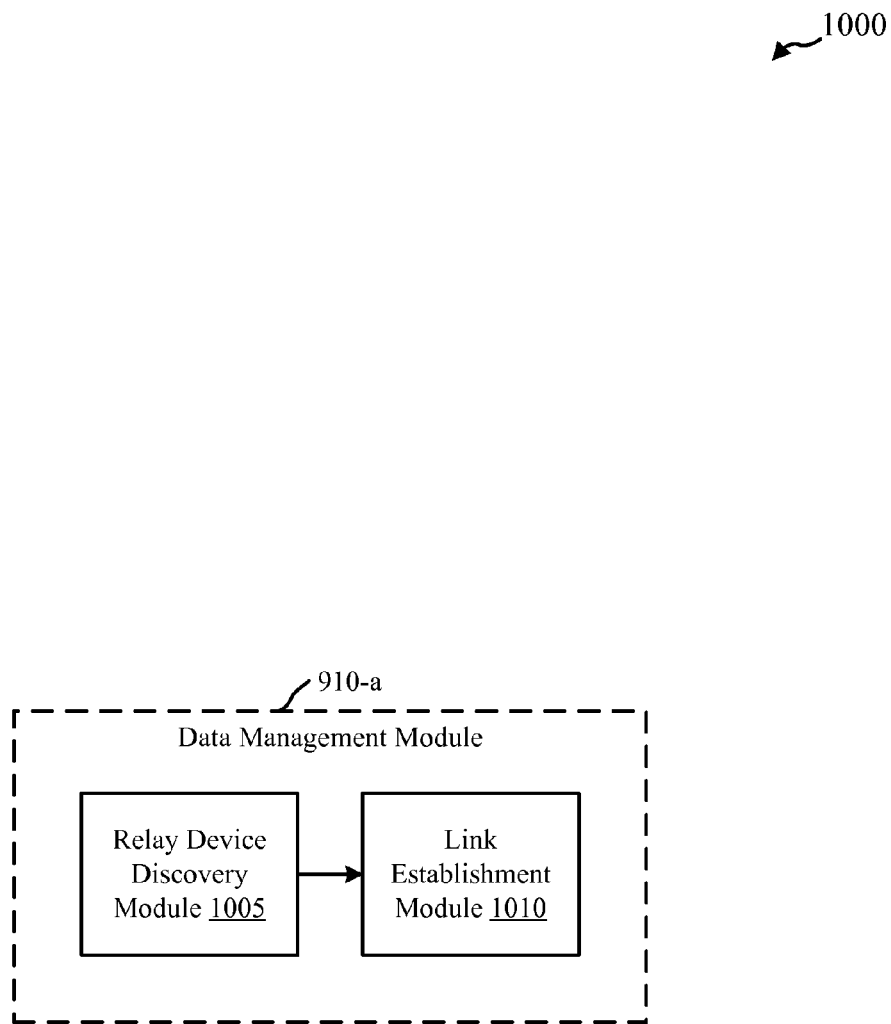
FIG. 10 is a block diagram illustrating one embodiment of a data management module in accordance with various embodiments.

FIG. 10 is a block diagram 1000 illustrating one embodiment of a data management 910-a. The data management 910-a may be an example of the data management 910 of FIG. 9. In one example, the data management 910-a may include a relay device discovery module 1005 and/or a link establishment module 1010.

The relay device discovery module 1005 may configure and coordinate discovery communications with a relay device 120 via the MTC transmitter and receiver 915, 905 of device 115-j as described in reference to FIG. 9. This may include configuring discovery signals and/or discovery response signals as described in greater detail in reference to FIGS. 5 and 6. Once discovery with a relay device 120 is complete, the relay device discovery module 1005 may communicate to the link establishment module 1010 that the relay may now be established.

The link establishment module 1010 may then coordinate, with the MTC transmitter 915 and the MTC receiver 905, to establish a peer to peer connection with the relay device 120. The link establishment module 1010 may then communicate with the MTC transmitter 915 to send uplink data to the relay device 120 to be relayed to a base station 105.

Figure 11:
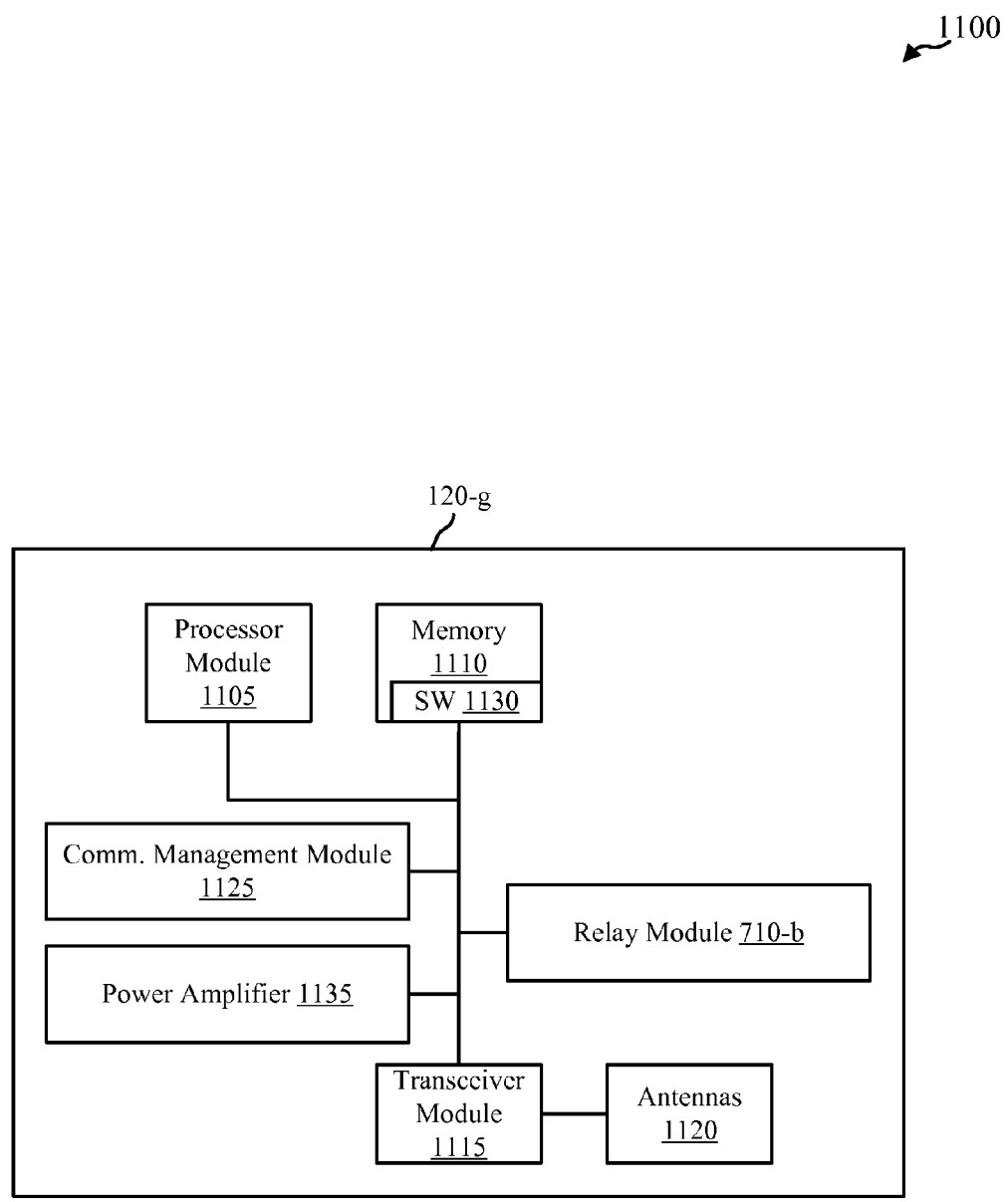
FIG. 11 shows a block diagram of a relay device that may be configured for relaying MTC communications in accordance with various embodiments.

FIG. 11 shows a block diagram 1100 of a relay device 120-g configured for relaying communications from an MTC device 115 to a base station 105 in accordance with various embodiments. The relay device 120-g may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The relay device 120-g may in some cases have an internal power supply (not shown), such as a small battery, to facilitate mobile operation. In some embodiments, the relay device 120-g may be an example of one or more aspects of one of the devices 120 described with reference to FIGS. 1, 3, 4, 5, 6, 7, and/or 8. The relay device 120-g may be configured to implement at least some of the features and functions described with reference to FIGS. 4, 5, and/or 6

The relay device 120-g may include a relay module 710-b, a processor module 1105, a memory module 1110, at least one transceiver module 1115, at least one antenna 1120, and/or a communication management module 1125. Each of these components may be in communication with each other, directly or indirectly.

The memory module 1110 may include random access memory (RAM) and/or read-only memory (ROM). The memory module 1110 may store computer-readable, computer-executable software (SW) code 1130 containing instructions that are configured to, when executed, cause the processor module 1105 to perform various functions described herein for communicating over a wireless communications system. Alternatively, the software code 1130 may not be directly executable by the processor module 1105 but may be configured to cause the relay device 120-*g* (e.g., when compiled and executed) to perform various of the functions described herein.

The processor module 1105 may include an intelligent hardware device, e.g., a central processing unit (CPU) such as an ARM® based processor, a microcontroller, an ASIC, etc. The processor module 1105 may process information received through the transceiver module(s) 1115 and/or information to be sent to the transceiver module(s) 1115 for transmission through the antenna(s) 1120. The processor module 1105 may handle, alone or in connection with the communication management module 1125, various aspects of communicating over a wireless communications system and/or detecting a communications network.

The transceiver module(s) 1115 may include a modem configured to modulate packets and provide the modulated packets to the antenna(s) 1120 for transmission, and to demodulate packets received from the antenna(s) 1120. The transceiver module(s) 1115 may in some cases be implemented as one or more transmitter modules and one or more separate receiver modules. The transceiver module(s) 1115 may support communications in a first spectrum, such as a WWAN or cellular spectrum, and in a second spectrum, such as a WLAN spectrum. The transceiver module(s) 1115 may be configured to communicate bi-directionally, via the antenna(s) 1120, with one or more of the MTC devices 115 or base stations 105 (e.g., eNBs and/or WLAN access points) described with reference to FIGS. 1, 2, 3, 4, 5 6, 7, and/or 9. While the relay device 120-*g* may include a single antenna, there may be embodiments in which the relay device 120-*g* may include multiple UE antennas 1120.

The relay device 120-*g* may also include a power amplifier 1135 that may allow the relay device 120-*g* to communicate over longer distances, for example with more base stations 105, than, for example an MTC device 115. Because the relay device 120-*g* may have a longer communication range than an MTC device 115, it may be beneficial for an MTC device 115 to relay communications via the relay device 120-*g* to expand the base stations 105 the MTC device 115 may communicate with, such as for example, that are greater distances from the MTC device 115.

The components of the relay device 120-*g* may be configured to implement aspects discussed above with respect to devices 120 of FIGS. 1, 3, 4, 5, 6, 7, and/or 8 and may not be repeated here for the sake of brevity. For example, relay module 710-*b* may include similar functionality as the relay module 710 of FIGS. 7 and/or 8.

In some embodiments, the transceiver module 1115 in conjunction with antenna(s) 1120, along with other possible components of relay device 120-*g*, may receive transmissions from one or more MTC devices 115 and may transmit uplink data from the MTC device 115 to base stations 105 or a core network 140 utilizing resources of the one or more relay devices 120. In some embodiments, the transceiver module 1115, in conjunction with antennas 1120 along with other possible components of relay device 120-*g*, such as the power amplifier 1135, may allow the relay device 120-*g* to receive transmissions from one or more MTC devices 115 and transmit uplink data from the MTC device 115 to base stations 105 or a core network 140. In some cases, relay device 120-*g*, MTC device 115, base stations 105, and/or core network 140 may utilize flexible waveforms.

Figure 12:
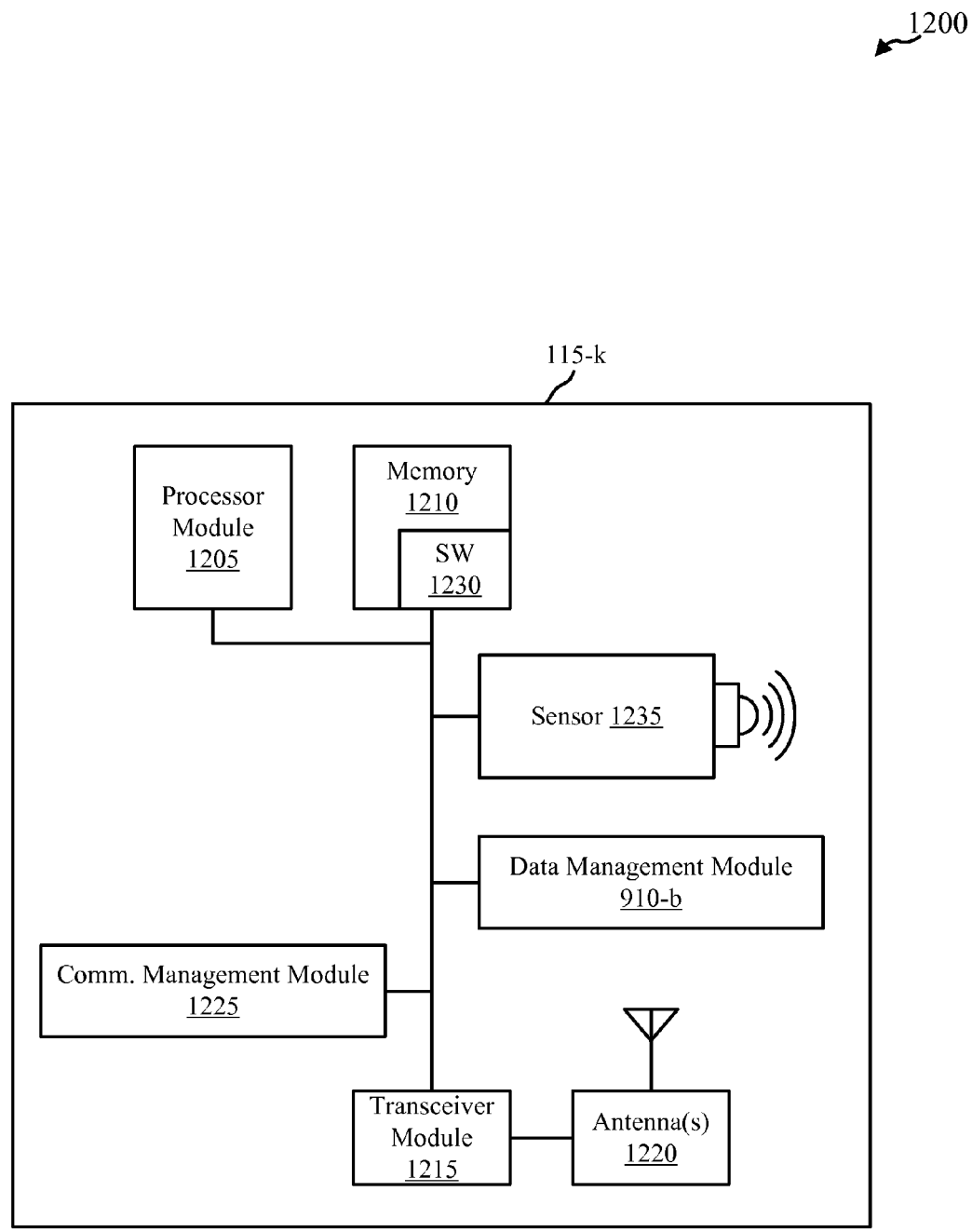
FIG. 12 shows a block diagram of an MTC device that may be configured for utilizing a relay device in accordance with various embodiments.

FIG. 12 is a block diagram 1200 of an MTC device 115-*k* configured for relaying communications, and particularly uplink communications, to a base station 105 through a relay device 120 in accordance with various embodiments. The MTC device 115-*k* may have any of various configurations, such as a sensor or monitor 1235 for various MTC applications discussed above. The MTC device 115-*k* may have an internal power supply (not shown), such as a small battery, to facilitate mobile operation. In some embodiments, the MTC device 115-*k* may be an example of and/or incorporate one or more aspects of the MTC device 115 of FIGS. 1, 2, 3, 4, 5, 6, 9, and/or 10. The MTC device 115-*k* may be a multi-mode mobile device. The MTC device 115-*k* may be referred to as an MTC UE or M2M device in some cases.

The MTC device 115-*k* may include a data management module 910-*b*, antenna(s) 1220, a transceiver module 1215, memory 1210, and a processor module 1205, which each may be in communication, directly or indirectly, with each other (e.g., via one or more buses). The transceiver module 1215 may be configured to communicate bi-directionally, via the antenna(s) 1220 and/or one or more wired or wireless links, with one or more networks, as described above. For example, the transceiver module 1215 may be configured to communicate bi-directionally with base stations 105 of FIGS. 1, 2, 3, 4, 5, and/or 6. The transceiver module 1215 may include a modem configured to modulate the packets and provide the modulated packets to the antenna(s) 1220 for transmission, and to demodulate packets received from the antenna(s) 1220. While the MTC device 115-*k* may include a single antenna 1220, the MTC device 115-*k* may include multiple antennas 1220 for multiple transmission links.

The memory 1210 may include random access memory (RAM) and read-only memory (ROM). The memory 1210 may store computer-readable, computer-executable software code 1230 containing instructions that are configured to, when executed, cause the processor module 1205 to perform various functions described herein (e.g., data capture, database management, message routing, etc.). Alternatively, the software code 1230 may not be directly executable by the processor module 1205 but be configured to cause the computer (e.g., when compiled and executed) to perform functions described herein.

The processor module 1205 may include an intelligent hardware device, e.g., a central processing unit (CPU) such as those made by Intel® Corporation, AMD®, or an ARM® based processor, a microcontroller, an application specific integrated circuit (ASIC), etc.

According to the architecture of FIG. 12, the MTC device 115-*k* may further include a communications management module 1225. The communications management module 1225 may manage communications with base stations 105, other MTC devices 115, and/or relay devices 120. By way of example, the communications management module 1225 may be a component of the MTC device 115-*k* in communication with some or all of the other components of the MTC device 115-*k* via a bus. Alternatively, functionality of the communications management module 1225 may be implemented as a component of the transceiver module 1215, as a computer program product, and/or as one or more controller elements of the processor module 1205.

The components for MTC device 115-k may be configured to implement aspects discussed above with respect to devices 115 of FIGS. 1, 2, 3, 4, 5, 6, 7, 9, and/or 10 and may not be repeated here for the sake of brevity. For example, the data management module 910-b may include similar functionality as data management module 910, 910-a of FIGS. 9 and/or 10.

In some embodiments, the transceiver module 1215 in conjunction with antenna(s) 1220, along with other possible components of MTC device 115-k, may receive transmissions from one or more relay devices 120 and may transmit uplink data from the to base stations 105 or a core network 140 utilizing resources of the one or more relay devices. In some embodiments, the transceiver module 1215, in conjunction with antennas 1220 along with other possible components of MTC device 115-k, may receive transmissions from one or more relay devices 120 and may transmit uplink data to base stations 105 or a core network 140 such that these devices or systems may utilize flexible waveforms.

In some embodiments, the MTC device 115-k may not have a power amplifier. In other cases, the MTC device 115-k may have a limited power amplifier compared to a standard UE power amplifier capable of 20 dB, for example a 1-3 dB power amplifier (not shown). In either case, the communication range of the MTC device 115-k may be limited. For this and other reasons, the ability of the MTC device 115-k to communicate uplink information, for example to a base station 105 or MTC server 210, may be limited. As a result, the techniques described above for relaying communications from the MTC device 115-k through a relay device 120 may improve uplink communications for the MTC device 115-k.

Figure 13:
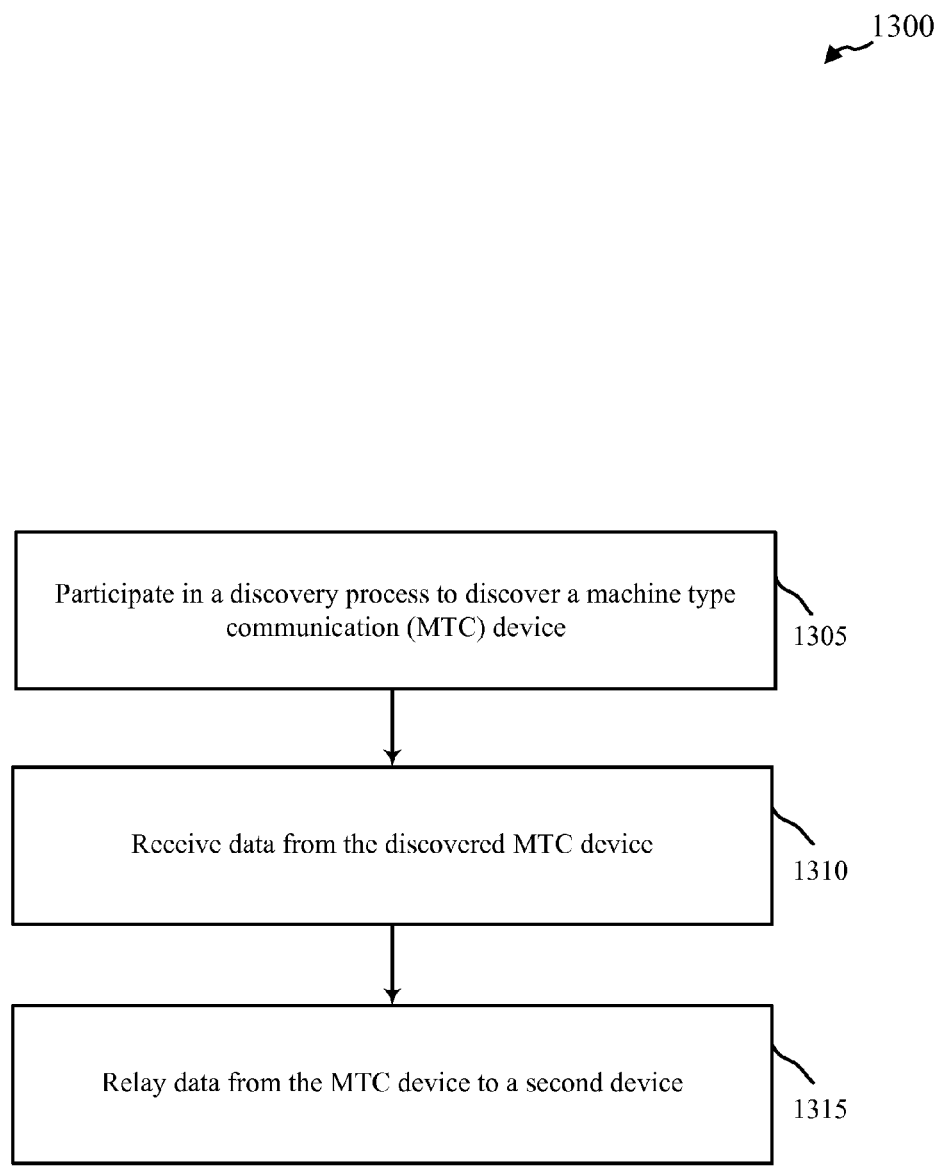
FIGS. 13-16 illustrate flowcharts of methods for relaying MTC communications in accordance with various embodiments.

FIG. 13 is a flow chart illustrating one example of a method 1300 for relaying communications from an MTC device 115 to a base station 105 through a relay device 120 in accordance with various embodiments. For clarity, the method 1300 is described below with reference to one or more aspects of one of the relay devices 120 described with reference to FIGS. 1, 3, 4, 5, 6, 7, 8, and/or 11. In some embodiments, a device, such as one of the relay devices 120, may execute one or more sets of codes to control the functional elements of the device to perform the functions described below.

At block 1305, a relay device 120 may participate in a discovery process to discover an MTC device. The operation(s) at block 1305 may in some cases be performed using the relay module 710 described with reference to FIGS. 7 and/or 8, the MTC discovery module 805 described with reference to FIG. 8, and/or the relay device receiver and/or transmitter 705, 715 as described in reference to FIG. 7.

At block 1310, data from the discovered MTC device may be received. The operation(s) at block 1310 may in some cases be performed using the relay module 710 described with reference to FIGS. 7 and/or 8, the first link establishment module 810 and/or the relay coordination module 820 described in reference to FIG. 8, and/or the relay device receiver 705 described with reference to FIG. 7.

At block 1315, data from the MTC device may be relayed to a second device. The operation(s) at block 1315 may in some cases be performed using the relay module 710 described with reference to FIGS. 7 and/or 8, the second link establishment module 815 and/or the relay coordination module 820 described in reference to FIG. 8, and/or the relay device transmitter 715 described with reference to FIG. 7.

Thus, the method 1300 may provide for relaying communications from an MTC device to a base station 105 through a relay device 120. It should be noted that the method 1300 is just one implementation and that the operations of the method 1300 may be rearranged or otherwise modified such that other implementations are possible.

Figure 14:
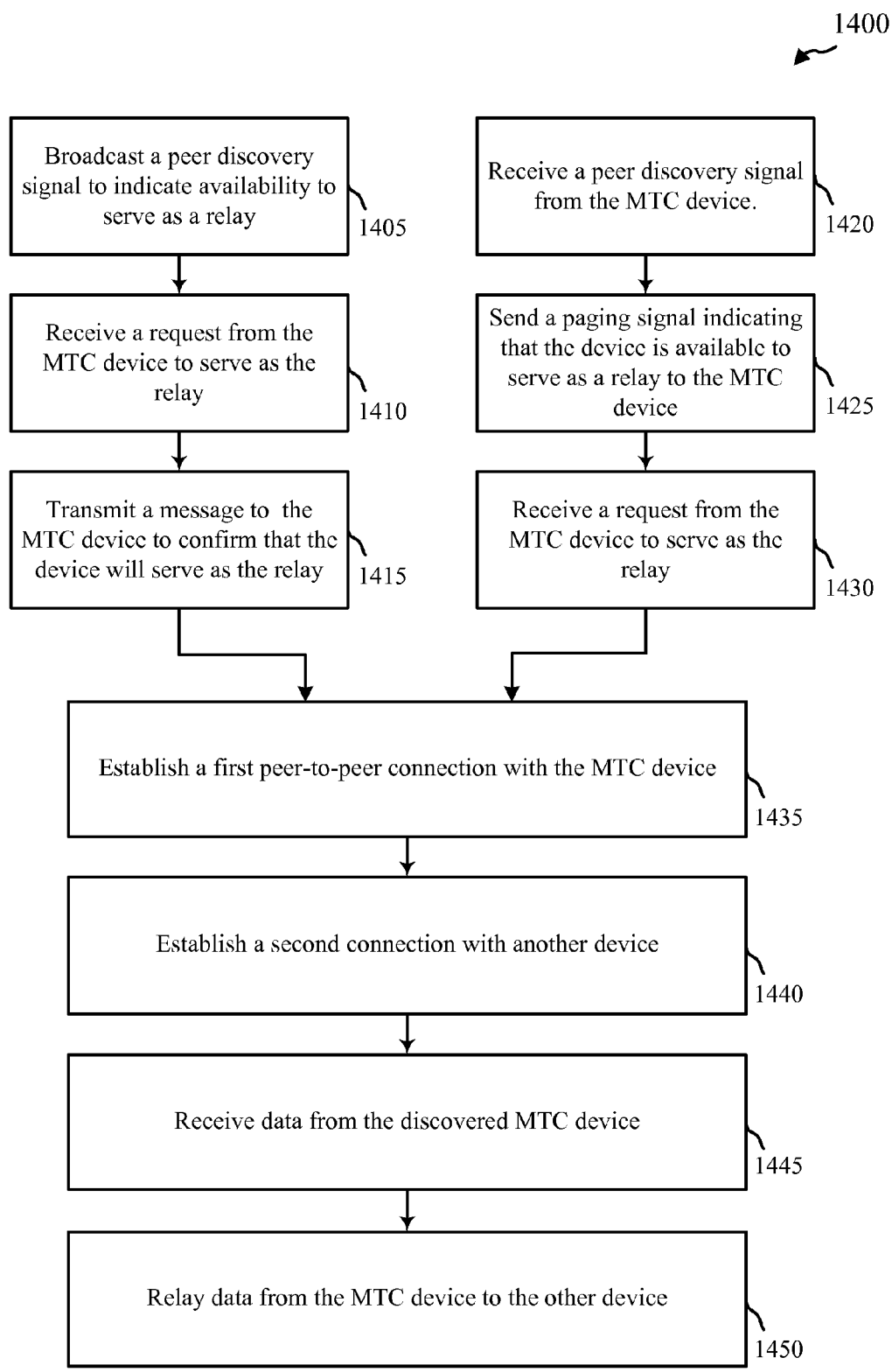

FIG. 14 is a flow chart illustrating one example of a method 1400 for relaying communications from an MTC device 115 to a base station 105 through a relay device 120 in accordance with various embodiments. For clarity, the method 1400 is described below with reference to one or more aspects of one of the relay devices 120 described with reference to FIGS. 1, 3, 4, 5, 6, 7, 8, and/or 11. In some embodiments, a device, such as one of the devices 120, may execute one or more sets of codes to control the functional elements of the device 120 to perform the functions described below.

In one configuration, a relay device 120 may initiate a discovery process, as illustrated in blocks 1405-1415. At block 1405, a peer discovery signal may be broadcast to indicate availability to serve as a relay. The operation(s) at block 1405 may in some cases be performed using the relay module 710 described with reference to FIGS. 7 and/or 8, the MTC discovery module 805 described with reference to FIG. 8, and/or the relay device transmitter 715 as described in reference to FIG. 7.

At block 1410, a request may be received from the MTC device to serve as the relay. The operation(s) at block 1410 may in some cases be performed using the relay module 710 described with reference to FIGS. 7 and/or 8, the MTC discovery module 805 described with reference to FIG. 8, and/or the relay device receiver 705 described with reference to FIG. 7.

At block 1415, a message may be transmitted to the MTC device to confirm that the device will serve as the relay. The operation(s) at block 1415 may in some cases be performed using the relay module 710 described with reference to FIGS. 7 and/or 8, the second link establishment module 815 and/or the relay coordination module 820 described in reference to FIG. 8, and/or the relay device transmitter 715 described with reference to FIG. 7.

In one embodiment, an MTC device 115 may initiate a discovery process, as illustrated in blocks 1420-1430. Accordingly, at block 1420, a peer discovery signal may be received from the MTC device. The operation(s) at block 1420 may in some cases be performed using the relay module 710 described with reference to FIGS. 7 and/or 8, the MTC discovery module 805 described with reference to FIG. 8, and/or the relay device receiver 705 described with reference to FIG. 7.

At block 1425, a paging signal may be sent that indicates that the relay device is available to serve as a relay for the MTC device. The operation(s) at block 1425 may in some cases be performed using the relay module 710 described with reference to FIGS. 7 and/or 8, the MTC discovery module 805 described with reference to FIG. 8, and/or the relay device transmitter 715 as described in reference to FIG. 7.

At block 1430, a request from the MTC device to serve as the relay may be received. The operation(s) at block 1430 may in some cases be performed using the relay module 710 described with reference to FIGS. 7 and/or 8, the MTC discovery module 805 described with reference to FIG. 8, and/or the relay device receiver 705 described with reference to FIG. 7.

After the discovery process is complete, such as at block 1415 or block 1430, a first peer-to-peer connection with the MTC device may be established at block 1435. The operation(s) at block 1435 may in some cases be performed using the relay module 710 described with reference to FIGS. 7 and/or 8, the first link establishment module 810 described with reference to FIG. 8, and/or the relay device receiver and/or transmitter 705, 715 described with reference to FIG. 7.

At block 1440, a second connection with another device may be established. The operation(s) at block 1440 may in some cases be performed using the relay module 710 described with reference to FIGS. 7 and/or 8, the second link establishment module 815 described with reference to FIG. 8, and/or the relay device receiver and/or transmitter 705, 715 described with reference to FIG. 7.

At block 1445, data from the discovered MTC device may be received. The operation(s) at block 1445 may in some cases be performed using the relay module 710 described with reference to FIGS. 7 and/or 8, the relay coordination module 820 described with reference to FIG. 8, and/or the relay device receiver 705 described with reference to FIG. 7.

At block 1450, data from the MTC device may be relayed to the other device. The operation(s) at block 1450 may in some cases be performed using the relay module 710 described with reference to FIGS. 7 and/or 8, the relay coordination module 820 described with reference to FIG. 8, and/or the relay device transmitter 715 described with reference to FIG. 7.

Thus, the method 1400 may provide for relaying communications from an MTC device to a base station 105 through a relay device 120. It should be noted that the method 1400 is just one implementation and that the operations of the method 1400 may be rearranged or otherwise modified such that other implementations are possible.

Figure 15:
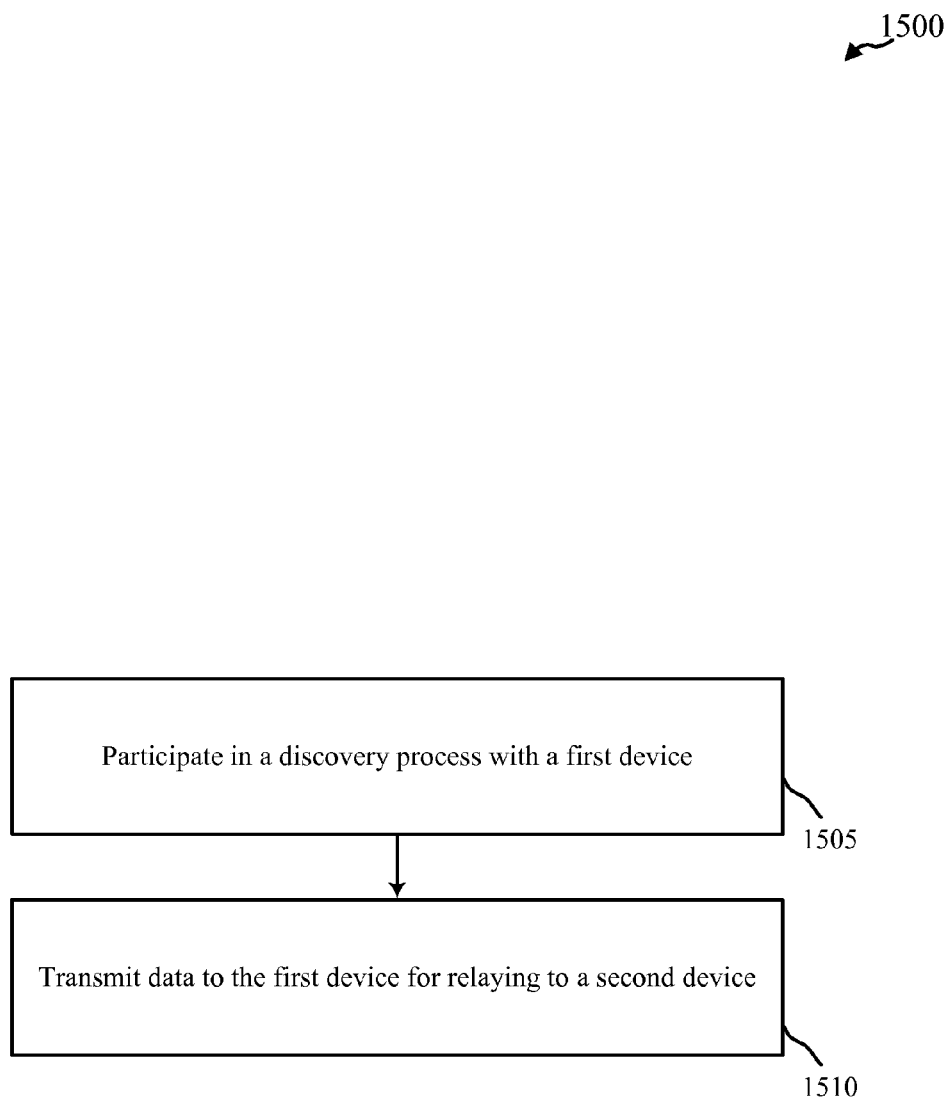

FIG. 15 is a flow chart illustrating one example of a method 1500 for relaying communications from an MTC device 115 to a base station 105 through a relay device 120 in accordance with various embodiments. For clarity, the method 1500 is described below with reference to one or more aspects of one of the devices 115 (e.g., an MTC device) described with reference to FIGS. 1, 2, 3, 4, 5, 6, 9, 10, and/or 12. In some embodiments, a device such as one of the devices 115, may execute one or more sets of codes to control the functional elements of the device to perform the functions described below.

At block 1505, the MTC device may participate in a discovery process with a first device. The operation(s) at block 1505 may in some cases be performed using the data management module 910 described in reference to FIGS. 9 and/or 10, the relay device discovery module 1005 described in reference to FIG. 10, and/or the MTC receiver and/or transmitter 905, 915 described in reference to FIG. 9.

At block 1510, data may be transmitted to the first device for relaying to a second device. The operation(s) at block 1510 may in some cases be performed using the data management module 910 described in reference to FIGS. 9 and/or 10, the link establishment module 1010 described in reference to FIG. 10, and/or the MTC transmitter 915 described in reference to FIG. 9. The first device may be a relay device 120 and the second device may be a base station 105.

Thus, the method 1500 may provide for relaying communications from an MTC device to a base station 105 through a relay device 120. It should be noted that the method 1500 is just one implementation and that the operations of the method 1500 may be rearranged or otherwise modified such that other implementations are possible.

Figure 16:
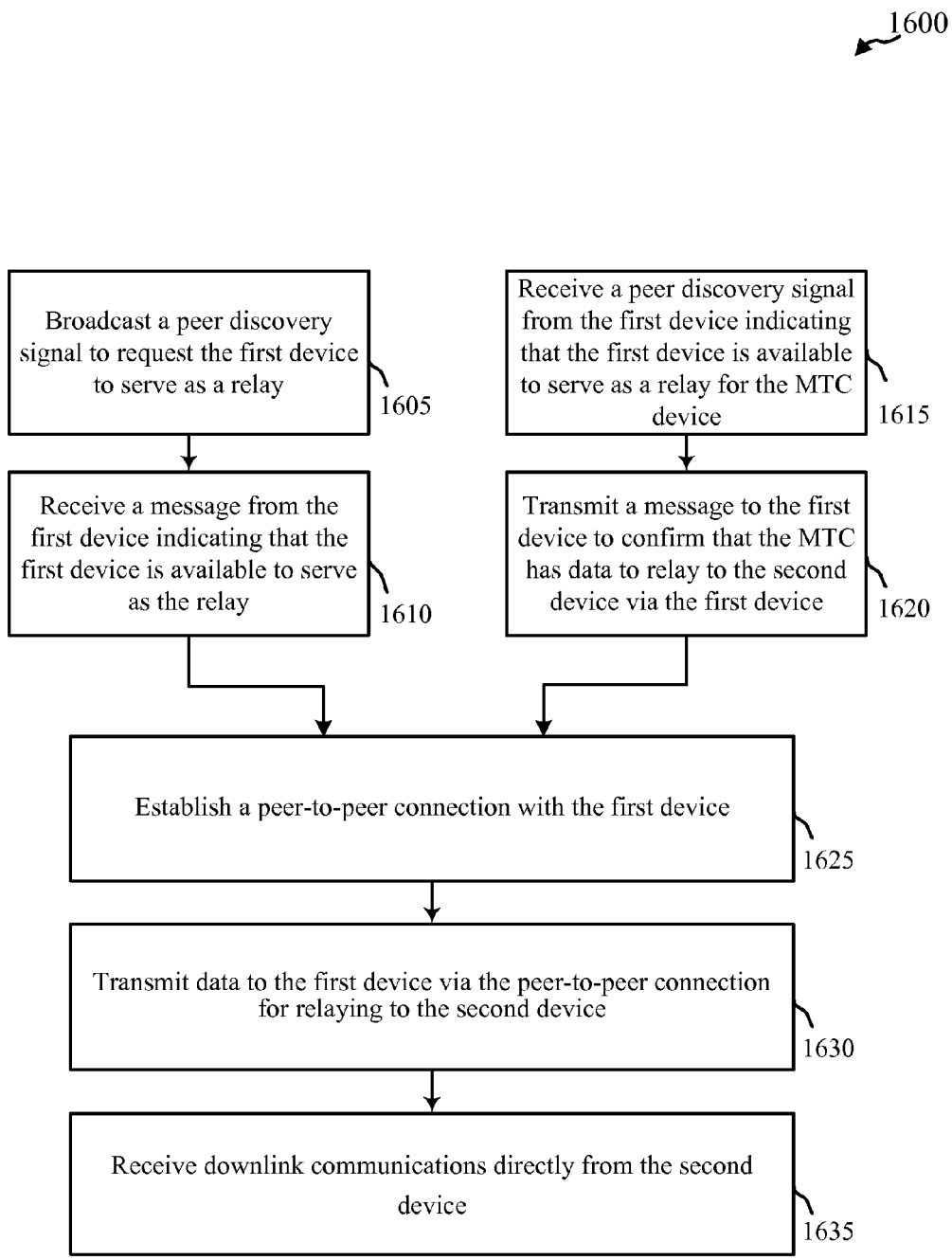

FIG. 16 is a flow chart illustrating one example of a method 1600 for relaying communications from an MTC device 115 to a base station 105 through a relay device 120 in accordance with various embodiments. For clarity, the method 1600 is described below with reference to one or more aspects of one of the devices 115 (e.g., an MTC device) described with reference to FIGS. 1, 2, 3, 4, 5, 6, 9, 10, and/or 12. In some embodiments, a device such as one of the devices 115, may execute one or more sets of codes to control the functional elements of the device to perform the functions described below.

In one embodiment, an MTC device may initiate a discovery process with a relay device, as illustrated in blocks 1605-1610. At block 1605, the MTC device 115 may broadcast a peer discovery signal to the first device to request that the first device serve as a relay. The operation(s) at block 1605 may in some cases be performed using the data management module 910 described in reference to FIGS. 9 and/or 10, the relay device discovery module 1005 described in reference to FIG. 10, and/or the MTC transmitter 915 described in reference to FIG. 9.

At block 1610, a message may be received from the first device indicating that the first device is available to serve as the relay. The operation(s) at block 1610 may in some cases be performed using the data management module 910 described in reference to FIGS. 9 and/or 10, the relay device discovery module 1005 described in reference to FIG. 10, and/or the MTC receiver 905 described in reference to FIG. 9.

In one configuration, the MTC device 115 may participate in a discovery process which was initiated by a relay device. For example, at block 1615, a peer discovery signal may be received from a first device indicating that the first device is available to serve as a relay for the MTC device. The operation(s) at block 1605 may in some cases be performed using the data management module 910 described in reference to FIGS. 9 and/or 10, the relay device discovery module 1005 described in reference to FIG. 10, and/or the MTC receiver 905 described in reference to FIG. 9.

At block 1620, a message may be transmitted to the first device to confirm that the MTC has data to relay to a second device via the first device The operation(s) at block 1620 may in some cases be performed using the data management module 910 described in reference to FIGS. 9 and/or 10, the relay device discovery module 1005 described in reference to FIG. 10, and/or the MTC transmitter 915 described in reference to FIG. 9.

After the discovery process is complete, such as at block 1610 or block 1620, a peer-to-peer connection may be established with the first device at block 1625. The operation(s) at block 1625 may in some cases be performed using the data management module 910 described in reference to FIGS. 9 and/or 10, the link establishment module 1010 described in reference to FIG. 10, and/or the MTC receiver and/or transmitter 905, 915 described in reference to FIG. 9.

At block 1630, data may be transmitted to the first device via the peer-to-peer connection for relaying to the second device. The operation(s) at block 1630 may in some cases be performed using the data management module 910 described in reference to FIGS. 9 and/or 10, the link establishment module 1010 described in reference to FIG. 10, and/or the MTC transmitter 915 described in reference to FIG. 9.

At block 1635, downlink communications may be received directly from the second device. The operation(s) at block 1635 may in some cases be performed using the data management module 910 described in reference to FIGS. 9 and/or 10, and/or the MTC receiver 905 described in reference to FIG. 9. The first device may be a relay device 120 and the second device may be a base station 105.

Thus, the method 1600 may provide for relaying communications from an MTC device to a base station 105 through a relay device 120. It should be noted that the method 1600 is just one implementation and that the operations of the method 1600 may be rearranged or otherwise modified such that other implementations are possible. One or more aspects of the method 1300, 1400, 1500, and/or 1600 may in some cases be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method of wireless communication performed at a first device comprising:
    participating in a discovery process to discover a machine type communication (MTC) device, wherein the MTC device is incapable of direct uplink transmissions to a second device based at least in part on a power amplifier deficiency of the MTC device;
    transmitting a message to the MTC device, the message comprising an indication that the first device will serve as a relay, wherein transmitting the message to the MTC device comprises routing the message to the MTC device via the second device;
    receiving, at the first device, uplink data from the MTC device; and
    relaying, by the first device, the uplink data from the MTC device to the second device, wherein the second device communicates directly on a downlink with the MTC device subsequent to the relaying.

2. The method of claim 1, further comprising:
    establishing a first peer-to-peer connection with the MTC device; and
    establishing a second connection with the second device.

3. The method of claim 1, wherein the participating in the discovery process with the MTC device comprises:
    broadcasting, by the first device, a peer discovery signal to indicate availability to serve as a relay.

4. The method of claim 1, wherein the participating in the discovery process with the MTC device comprises:
    receiving a peer discovery signal from the MTC device.

5. The method of claim 4, further comprising:
    transmitting the message to the MTC device, the message indicating that the first device is available to serve as a relay; and
    receiving a request from the MTC device to serve as the relay.

6. The method of claim 5, wherein the transmitting the message to the MTC device comprises:
    routing the message to the MTC device via the second device.

7. The method of claim 1, wherein the second device is a cellular base station.

8. The method of claim 1, wherein the second device is a wireless local area network (WLAN) access point.

9. A first device for relaying MTC data, comprising:
    a processor;
    memory in electronic communication with the processor; and
    instructions stored in the memory, the instructions being executable by the processor to:
    participate in a discovery process to discover a machine type communication (MTC) device, wherein the MTC device is incapable of direct uplink transmissions to a second device based at least in part on a power amplifier deficiency of the MTC device;
    transmit a message to the MTC device, the message comprising an indication that the first device will serve as a relay, wherein transmitting the message to the MTC device comprises routing the message to the MTC device via the second device;
    receive uplink data from the MTC device; and
    relay the uplink data from the MTC device to the second device, wherein the second device communicates directly on a downlink with the MTC device subsequent to the relaying.

10. The first device of claim 9, wherein the instructions are executable by the processor to:
    establish a first peer-to-peer connection with the MTC device; and
    establish a second connection with the second device.

11. The first device of claim 9, wherein the instructions are executable by the processor to:
    transmit one or more messages to the MTC device via routing through the second device.

12. A method of wireless communication performed by a machine type communication (MTC) device that is incapable of direct uplink transmissions to a second device based at least in part on a power amplifier deficiency of the MTC device, comprising:
    participating in a discovery process with a first device;
    receiving a message, the message comprising an indication that the first device will serve as a relay, wherein the MTC device receives the message from the first device via routing through the second device;
    transmitting uplink data, by the MTC device, to the first device for relaying to the second device; and
    subsequent to the transmitting, receiving, by the MTC device, downlink communications directly from the second device.

13. The method of claim 12, further comprising:
    establishing a peer-to-peer connection with the first device; and
    wherein transmitting data to the first device for relaying to the second device is via the peer-to-peer connection.

14. The method of claim 12, wherein the participating in the discovery process with the first device comprises:
    broadcasting a peer discovery signal to request the first device to serve as a relay.

15. The method of claim 12, wherein the participating in the discovery process with the first device comprises:
    receiving a peer discovery signal from the first device, the peer discovery signal indicating that the first device is available to serve as a relay for the MTC device.

16. The method of claim 15, further comprising:
    transmitting a second message to the first device, the second message confirming that the MTC device has data to relay to the second device via the first device.

17. The method of claim 12, wherein the second device is a cellular base station.

18. The method of claim 12, wherein the second device is a wireless local area network (WLAN) access point.

19. A machine type communications (MTC) device that is incapable of direct uplink transmissions to a second device based at least in part on a power amplifier deficiency of the MTC device comprising:
    a processor;
    memory in electronic communication with the processor; and
    instructions stored in the memory, the instructions being executable by the processor to:
    participate in a discovery process with a first device;
    receive a message, the message comprising an indication that the first device will serve as a relay, wherein the MTC device receives the message from the first device via routing through the second device;
    transmit uplink data to the first device for relaying to the second device; and subsequent to the transmitting, receive downlink communications directly from the second device.

20. The MTC device of claim 19, wherein the instructions are executable by the processor to:
establish a peer-to-peer connection with the first device; and
transmit data to the first device via the peer-to-peer connection for relaying to the second device.

21. The MTC device of claim 19, wherein the instructions are executable by the processor to:
receive one or more messages from the first device via routing through the second device.

* * * * *